(12) United States Patent
Chen et al.

(10) Patent No.: US 12,399,545 B2
(45) Date of Patent: Aug. 26, 2025

(54) POWER MANAGEMENT WATCHDOG

(71) Applicant: Intel Corporation, Santa Clara, CA (US)

(72) Inventors: Wei Chih Chen, New Taipei (TW); Thiam Wah Loh, Singapore (SG); Wei Shun Chang, Taipei (TW)

(73) Assignee: Intel Corporation, Santa Clara, CA (US)

( * ) Notice: Subject to any disclaimer, the term of this patent is extended or adjusted under 35 U.S.C. 154(b) by 663 days.

(21) Appl. No.: 17/550,197

(22) Filed: Dec. 14, 2021

(65) Prior Publication Data
US 2023/0185349 A1 Jun. 15, 2023

(51) Int. Cl.
*G06F 1/00* (2006.01)
*G06F 1/14* (2006.01)
*G06F 1/28* (2006.01)
*G06F 1/3203* (2019.01)

(52) U.S. Cl.
CPC .................. *G06F 1/28* (2013.01); *G06F 1/14* (2013.01); *G06F 1/3203* (2013.01)

(58) Field of Classification Search
CPC . G06F 1/28; G06F 1/14; G06F 1/3203; G06F 1/3228; G06F 1/3246; G06F 1/3287; G06F 11/0757; G06F 11/0754; G06F 1/3206; Y02D 10/00
USPC ....................................................... 713/320
See application file for complete search history.

(56) References Cited

U.S. PATENT DOCUMENTS

| | | | | |
|---|---|---|---|---|
| 5,339,437 A * | 8/1994 | Yuen | ..................... | G06F 1/3203 714/E11.14 |
| 6,463,001 B1 * | 10/2002 | Williams | ............ | G06F 13/1636 365/189.12 |
| 9,760,158 B2 * | 9/2017 | Weissmann | ........... | G06F 1/3287 |
| 2008/0052543 A1 * | 2/2008 | Sokorac | ................ | G06F 1/3228 713/300 |
| 2009/0070607 A1 * | 3/2009 | Safford | ................. | G06F 1/3234 713/320 |
| 2015/0355705 A1 * | 12/2015 | Weissmann | ............. | G06F 1/324 713/320 |
| 2016/0205625 A1 * | 7/2016 | Stojanovski | .......... | H04W 76/27 370/311 |
| 2017/0010933 A1 * | 1/2017 | Wang | .................. | G06F 11/0757 |
| 2017/0371402 A1 * | 12/2017 | Cooper | .................... | G06F 1/206 |
| 2018/0113764 A1 * | 4/2018 | Bhandari | ............ | G06F 11/0712 |
| 2018/0336111 A1 * | 11/2018 | Gendler | ................ | G06F 1/3287 |

OTHER PUBLICATIONS

Extended European Search Report from European Patent Application No. 22206107.9 notified May 12, 2023, 10 pgs.

* cited by examiner

*Primary Examiner* — Volvick Derose
(74) *Attorney, Agent, or Firm* — Essential Patents Group, LLP

(57) ABSTRACT

An embodiment of an integrated circuit may comprise a circuit block and a power management circuit coupled to the circuit block to manage two or more power states for the circuit block and to manage a request for the circuit block to enter a requested power state of the two or more power states, set a watchdog timer in response to the request, and monitor the watchdog timer and a transition of the circuit block from a current power state to the requested power state. Other embodiments are disclosed and claimed.

21 Claims, 16 Drawing Sheets

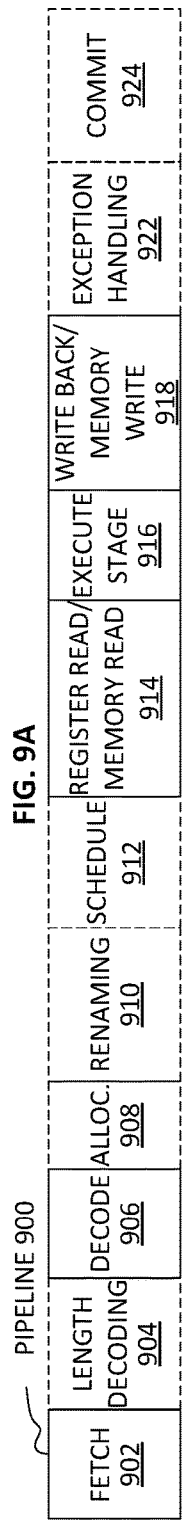
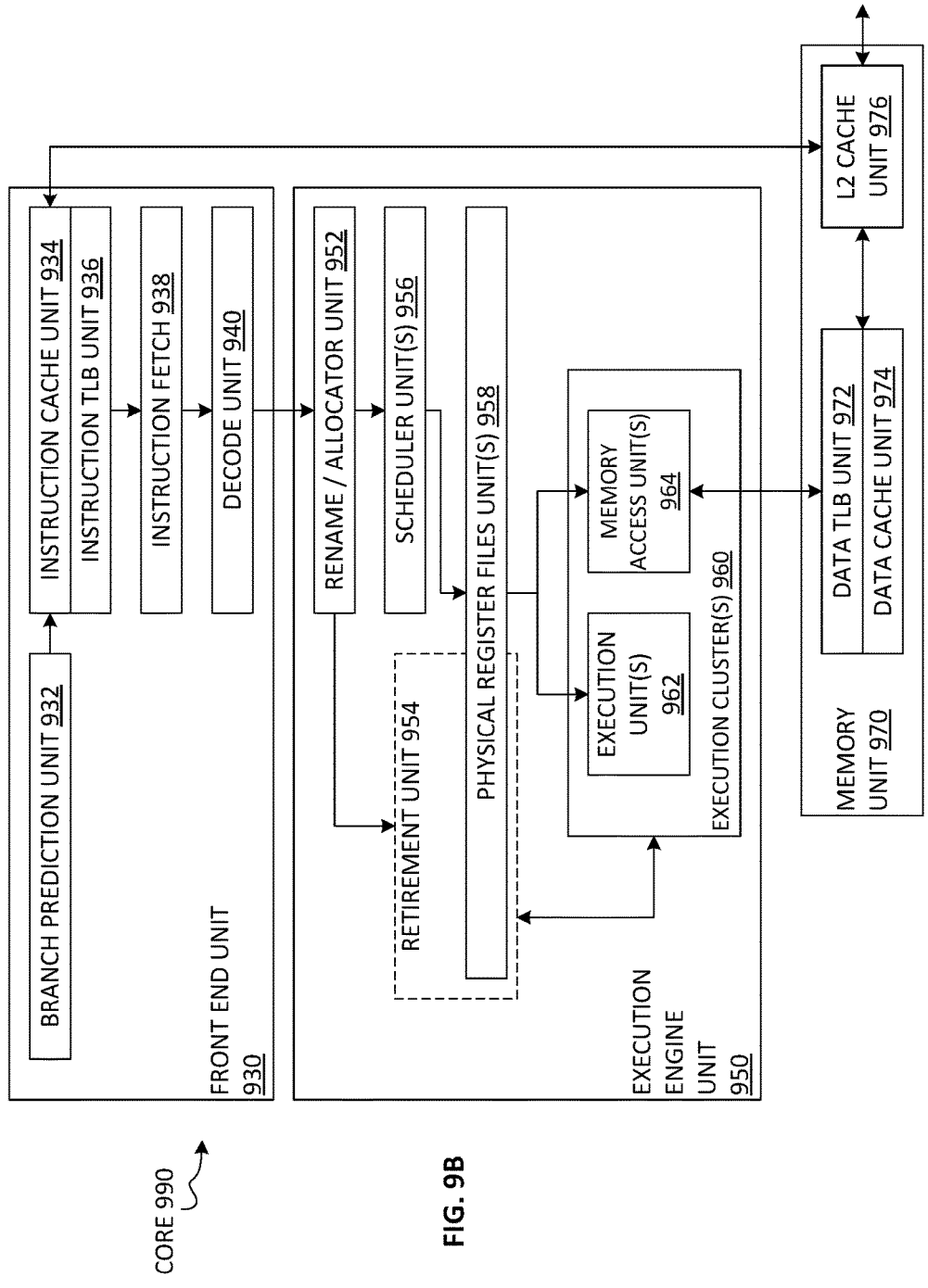
FIG. 9A
FIG. 9B

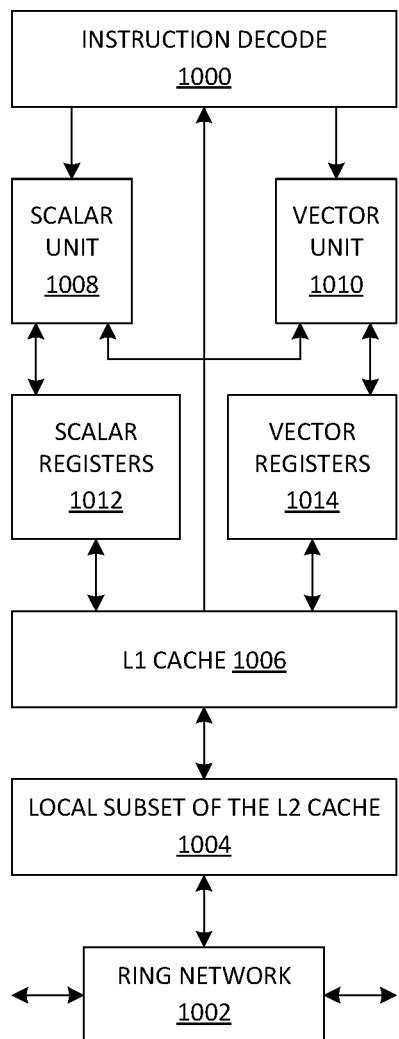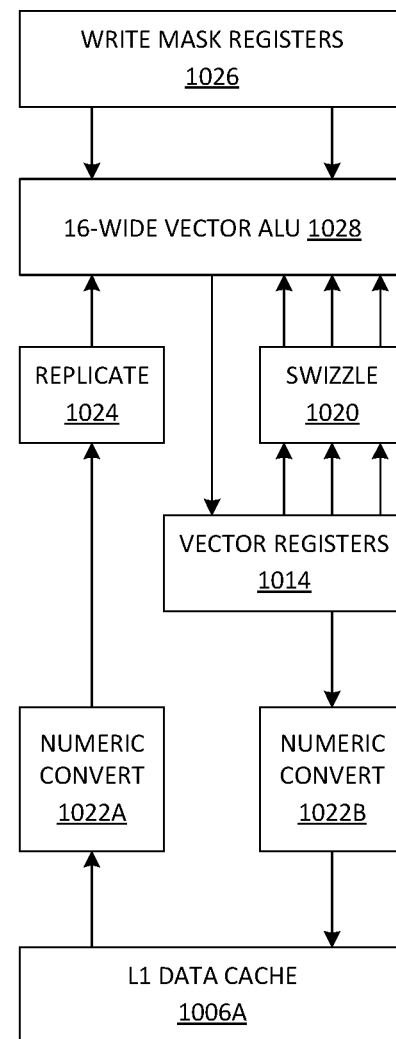
FIG. 10A
FIG. 10B

POWER MANAGEMENT WATCHDOG

BACKGROUND

1. Technical Field

This disclosure generally relates to power management technology, and watchdog technology.

2. Background Art

In the computer field, a watchdog timer refers to an electronic or software timer that is used to detect and recover from computer malfunctions. Watchdog timers may be utilized to automatically correct various hardware faults, to prevent malfunctioning or malicious software from disrupting system operation, etc. During normal operation, the computer regularly restarts the watchdog timer to prevent the timer from timing out or expiring. If the watchdog timer expires (e.g., the computer fails to restart the watchdog due to a hardware fault or program error), the watchdog timer will generate a timeout signal to initiate corrective actions. Various controllers may include an integrated, on-chip watchdog timer.

BRIEF DESCRIPTION OF THE DRAWINGS

The various embodiments of the present invention are illustrated by way of example, and not by way of limitation, in the figures of the accompanying drawings and in which:

FIG. 9A is a block diagram illustrating both an exemplary in-order pipeline and an exemplary register renaming, out-of-order issue/execution pipeline according to embodiments of the invention;

FIG. 9B is a block diagram illustrating both an exemplary embodiment of an in-order architecture core and an exemplary register renaming, out-of-order issue/execution architecture core to be included in a processor according to embodiments of the invention;

FIGS. 10A-B illustrate a block diagram of a more specific exemplary in-order core architecture, which core would be one of several logic blocks (including other cores of the same type and/or different types) in a chip;

DETAILED DESCRIPTION

Figure 1:
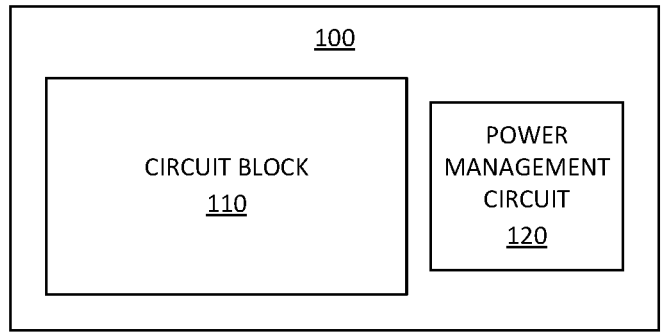
FIG. 1 is a block diagram of an example of an integrated circuit (IC) according to an embodiment.

Embodiments discussed herein variously provide techniques and mechanisms for a power management watchdog. The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including integrated circuitry which is operable to provide a power management watchdog.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

In electronic design, a semiconductor intellectual property (IP) core (SIP core), IP core, or IP block may refer to a reusable unit of logic, cell, or integrated circuit (IC) layout design. For example, ICs such as application-specific integrated circuits (ASICs), systems of field-programmable gate array (FPGA) logic, system-on-chips (SOCs), etc., may use IP blocks as part of an IC device design. As used herein, a circuit block refers to a unit of logic, cell, or integrated circuit (IC) layout design, and encompasses re-usable blocks such as IP blocks. The placement of the circuit blocks, routing, heatsink locations, etc., make up the physical layout characteristics of the IC device.

With increased complexity of a computer system, SOC, platform, etc., high-power consumptions and stability may be a problem. For example, a software (SW) or hardware (HW) change may introduce an unanticipated increase in power consumption and/or reduction of battery life in such complex devices. For example, various power optimizations and/or stability verifications may be performed before a computer device/system is delivered to a user. Some later discovered problems after the system is placed into service may be attempted to be addressed by a SW and/or firmware (FW) update released to the user. One problem with conventional approaches to power management is that validation coverage is limited. Even with extensive validations, many of the user configurations in deployed applications that may affect a system's low power state may not be sufficiently considered. For example, a new unvalidated Universal Serial Bus (USB), thunderbolt, etc. device utilized by a user may block a controller from entering a low power state.

Another problem with conventional approaches to power management is that there are numerous (e.g., almost unlimited) permutations of operating system (OS) and SW environments. After a computer device/system is delivered to the user and placed into service, new applications and drivers are updated regularly, but the validation effort may be reduced. In addition, applications (e.g., such as antivirus SW) may also change the OS behavior. Such changes may cause unanticipated scenarios (e.g., corner cases) or misconfigurations on hardware devices that cause problems for the user such as reduced battery life. For example, software or hardware changes may cause unpredictable battery life because power management malfunctions may lead to thermal overrun. For example, after a notebook computer lid is closed by the user and the user puts the notebook computer inside a bag, if the system fails to enter a power saving mode then excessive heat may be generated inside the bag and the battery may drain. Such power management malfunction may cause premature aging of the battery due to the thermal stresses and higher charging cycle due to drained battery.

With conventional power management technology, high-power consumption issues may be caused by devices or HW IP blocks not entering the correct low power state (e.g., as requested), due to untested scenarios, new hardware, new drivers, new use cases, etc. For example, an OS may request a driver to put a target device in a low power mode, but the OS does not know if the target device actually enters the requested lower power state. A device may be left in an active mode when the system is otherwise idle because of a wrong configuration or other issues, and the device cannot notify the OS/SW to take further actions for power saving when the system is otherwise idle. With a prematurely aged battery, a battery powered device may drain randomly and cannot guarantee function availability because various devices or circuit blocks do not properly enter the requested power saving state.

Another problem with conventional power management technology is insufficient traceability of some power management issues. Without traces at a point of failure, addressing a power management issue is time consuming and difficult to debug. Some embodiments overcome one or more of the foregoing problems.

Embodiments may provide power management with failsafe technology, that increases a probability that power management failure events may be resolved (e.g., even after SW, HW, or FW changes to a system). Embodiments of the failsafe technology may improve the user experience, because the user may experience fewer issues with unwarranted high power consumption, poor battery life, and/or premature aging of the battery. Embodiments of the failsafe technology may prevent power drains on all or most circuit blocks of a computer system and ensure that the circuit blocks always enter the requested power saving state properly (e.g., particularly circuit blocks that include the failsafe technology). Embodiments may also provide fine granularity trace (e.g., at a circuit block level) of power issues. Advantageously, embodiments may simplify debug of power issues with an IP block specific watchdog for power states that identifies a point of failure.

Some embodiments provide technology for a power management watchdog (PMWD). Some embodiments provide PMWD technology at a circuit block granularity. For each hardware IP on a SOC, for example, a PMWD will be provided. If an embodiment of a hardware block with a PMWD fails to transit to a requested power state, the watchdog will generate an interrupt to inform the OS and the OS may act to properly handle the issue. Embodiments of the PMWD technology described herein may advantageously perform failsafe protections of critical energy resources (e.g., battery capacity) to avoid unwarranted high power consumption and/or poor device battery life. Embodiments of PMWD technology may also advantageously perform failsafe protections to avoid thermal overrun (e.g., complementing other power management techniques at a SOC level). Embodiments of PMWD technology may also advantageously more clearly identify a circuit block that is causing a power state fault (e.g., what circuit block(s) failed to transit) along with the states involved (e.g., HW IP "X" failed to transit from its current power state "A" to a requested power state "B").

Advantageously, some embodiments may provide an improved battery life experience, and may reduce or prevent a user from experiencing a low battery condition for unknown reasons. Some embodiments of PMWD technology may be utilized to inform a user of a device/circuit block that is causing a power management problem, so that the user may act to correct the problem or replace the problematic device. Advantageously, some embodiments may provide improved power management that reduces a number or charging and discharging cycles of a battery, potentially improving the battery life.

Suitable logic and/or circuitry to implement the PMWD technology described herein may be incorporated at any suitable location in a computer system. In some embodiments, the PMWD technology may be implemented as an independent power management circuit integrated with a circuit block. In some embodiments, a circuit block may include some type of controller and the PMWD technology may be integrated with the controller. Different electronic systems or platforms may include a variety of controllers including, for example, a memory controller (MC), a system management controller (SMC), a power management unit (PMU or P-Unit), a power control unit (PCU), a system management unit (SMU), a power management integrated circuit (PMIC), a baseboard management controller (BMC), etc., each of which may be a circuit block of the system/platform. A PCU, P-Unit, or PMIC may be implemented as a microcontroller that governs power and other functions of a system/platform (e.g., where the various functions may correspond to respective circuit blocks). For example, a P-unit/PMIC may include its own dedicated firmware/software, memory, a central processor unit (CPU), input/output (IO) functions, timers, analog-to-digital (A/D) converters, etc. In some systems, the PCU/P-Unit/PMIC may remain active even when the system is otherwise shut down.

Although nominally referred to for its power management capabilities, the PCU/P-Unit/PMIC may also manage other functions such as IO, interfacing with built in keypads/touchpads, clock regulation, etc. Likewise, other management controllers that do not nominally refer to power management (e.g., a SMU, a SMC, a BMC), may also manage power or power-related functions. A BMC may also be implemented as a microcontroller, generally located on a motherboard of a system/platform (e.g., a server). The BMC may include its own firmware/memory/etc. and manages an interface between system-management software and platform hardware. In accordance with some embodiments, one or more of the foregoing example controllers, or circuit blocks within such controllers, may be further configured with the PMWD technology described herein to report a power state transition failure of a circuit block to an OS (e.g., to an OS power manager (OSPM)).

With reference to FIG. 1, an embodiment of an integrated circuit 100 may include a circuit block 110, and a power management circuit 120 coupled to the circuit block 110 to manage two or more power states for the circuit block 110 and to manage a request for the circuit block 110 to enter a requested power state of the two or more power states, set a watchdog timer in response to the request, and monitor the watchdog timer and a transition of the circuit block 110 from a current power state to the requested power state. In some embodiments, the power management circuit 120 may be further configured to report an indication that the transition to the requested power state failed if the watchdog timer expires. The power management circuit 120 may also be configured to report an identification of the circuit block 110 together with the indication that the transition to the requested power state failed if the watchdog timer expires. The power management circuit 120 may also be configured to report an indication of the current power state of the circuit block 110 and the requested power state together with the identification of the circuit block 110 and the indication that the transition to the requested power state failed if the watchdog timer expires.

In some embodiments, the power management circuit 120 may be additionally or alternatively configured to generate an interrupt to an OSPM that indicates that the transition to the requested power state failed if the watchdog timer expires, and/or to force the circuit block 110 to transition to the requested power state after a threshold number of watchdog timer expirations or generated interrupts (e.g., after two or three watchdog timer timeouts or interrupts sent to the OSPM). For example, the power management circuit 120 may be configured to maintain a timeout counter for the watchdog timer, initialize the timeout counter to a value indicated along with the request for the circuit block 110 to enter the requested power state, decrement the timeout counter if the current power state of the circuit block has not reached the requested power state, and generate an interrupt to an OSPM that indicates that the transition to the requested power state failed if the timeout counter reaches an expiration value. In some embodiments, further information such as the identification of the circuit block 110, a current power state of the circuit block 110, and the requested power state may be provided to the OSPM together with the interrupt.

Figure 8:
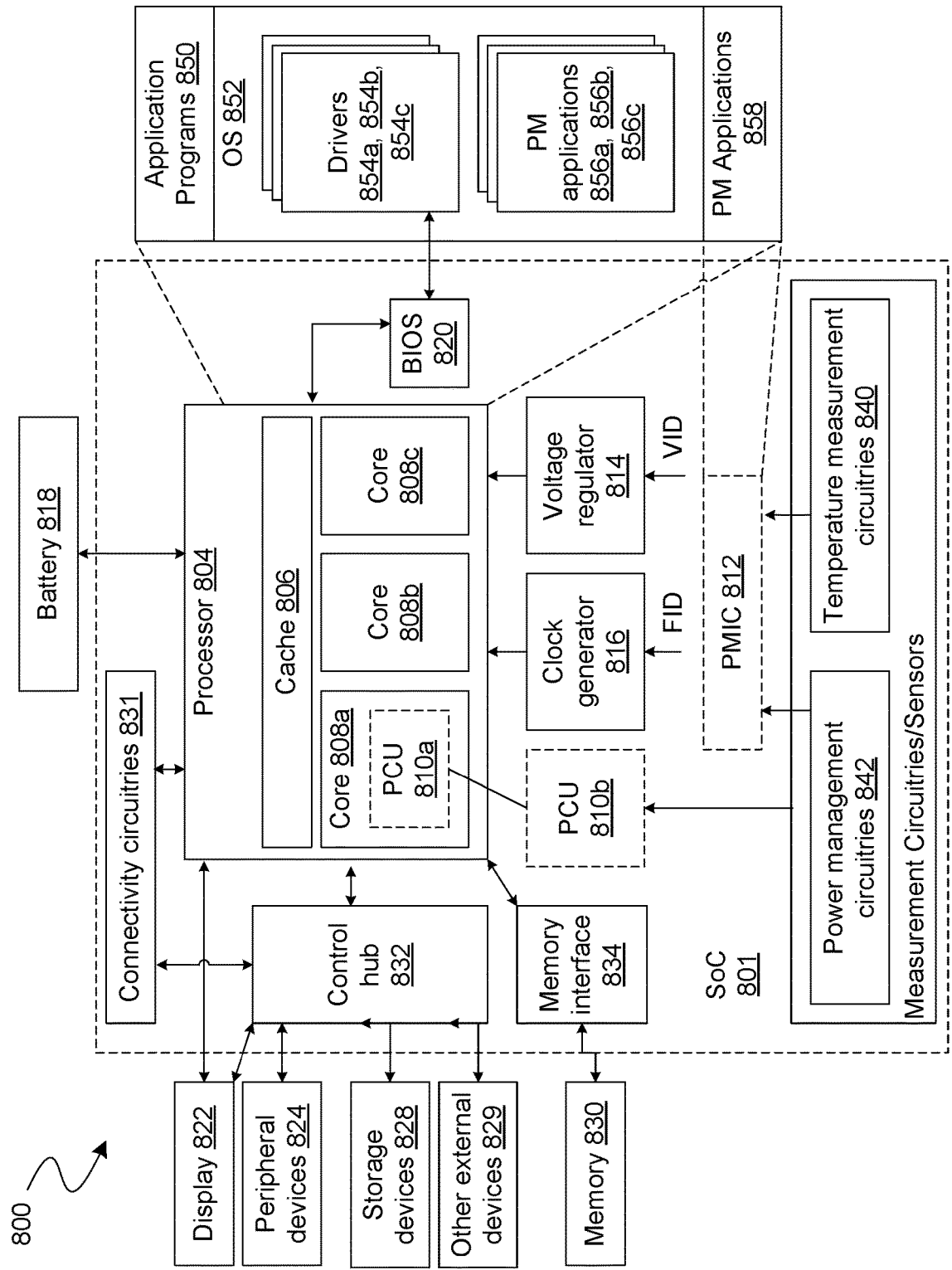
FIG. 8 is a block diagram of another example of a computer system according to an embodiment.

Embodiments of the circuit block 110 and/or power management circuit 120 may be incorporated in or integrated with a circuit block of any suitable controller of an electronic system/platform including, for example, a PCU, a PMIC, a P-Unit, a MC, etc. Although illustrated in FIG. 1 as being separate from the circuit block 110, in some embodiments all or portion of the power management circuit 120 may be co-located with the circuit block 110. Embodiments of the integrated circuit 100, including the circuit block 110, and/or the power management circuit 120, may be integrated with any of the circuit blocks described herein including, for example, the processor 804 (FIG. 8), the cores 808a, 808b, 808c (FIG. 8), the control hub 832 (FIG. 8), the VR 814 (FIG. 8), the memory interface 834 (FIG. 8), the core 990 (FIG. 9B), the cores 1102A-N (FIG. 11), the special purpose logic 1108 (FIG. 11), the IMCs 1114 (FIG. 11), the bus controller 1116 (FIG. 11), the processor 1210 (FIG. 12), the controller hub 1220 (FIG. 12; e.g., and/or the GMCH 1290 and the IOH 1250), the co-processor 1245 (FIG. 12), the processor 1315 (FIG. 13), the processor 1370 (FIG. 13), the processor/coprocessor 1380 (FIG. 13), the coprocessor 1338 (FIG. 13), the chipset 1390 (FIG. 14), the coprocessor 1520 (FIG. 15), and/or the processors 1614, 1616 (FIG. 16). In particular, embodiments of the power management circuit 120 may be incorporated in the PCU 810a,b (FIG. 8), and/or the PMIC 812 (FIG. 8).

Figure 2A:
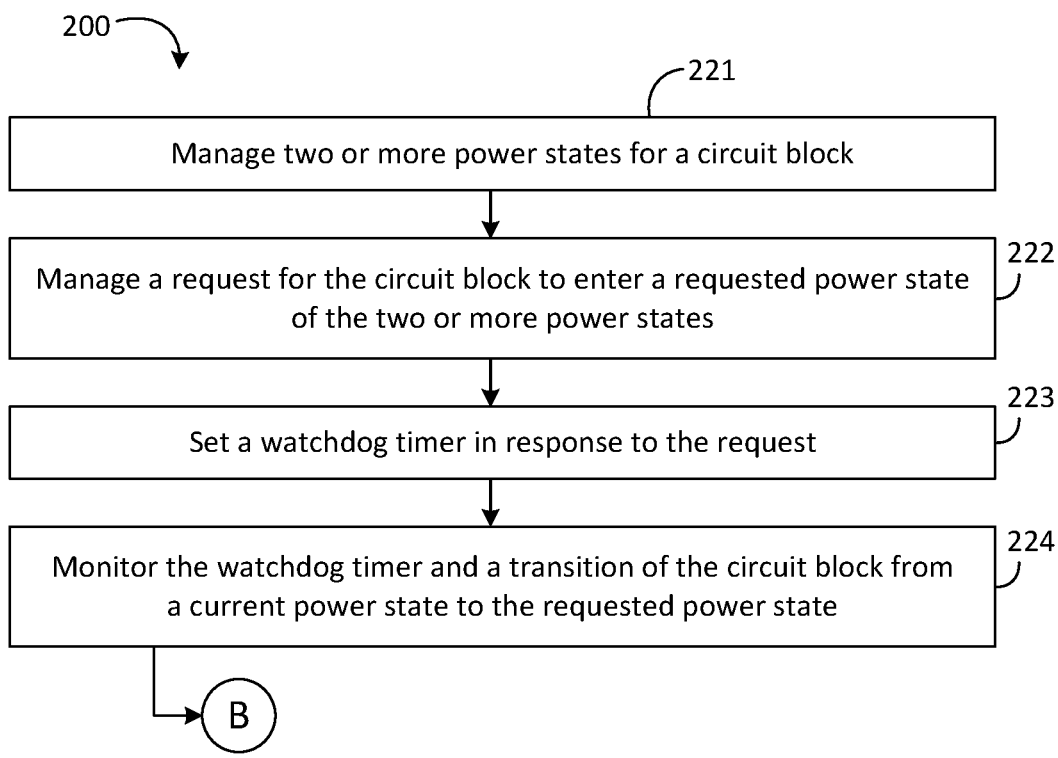
FIGS. 2A to 2B are illustrative diagrams of an example of a method according to an embodiment.
Figure 2B:
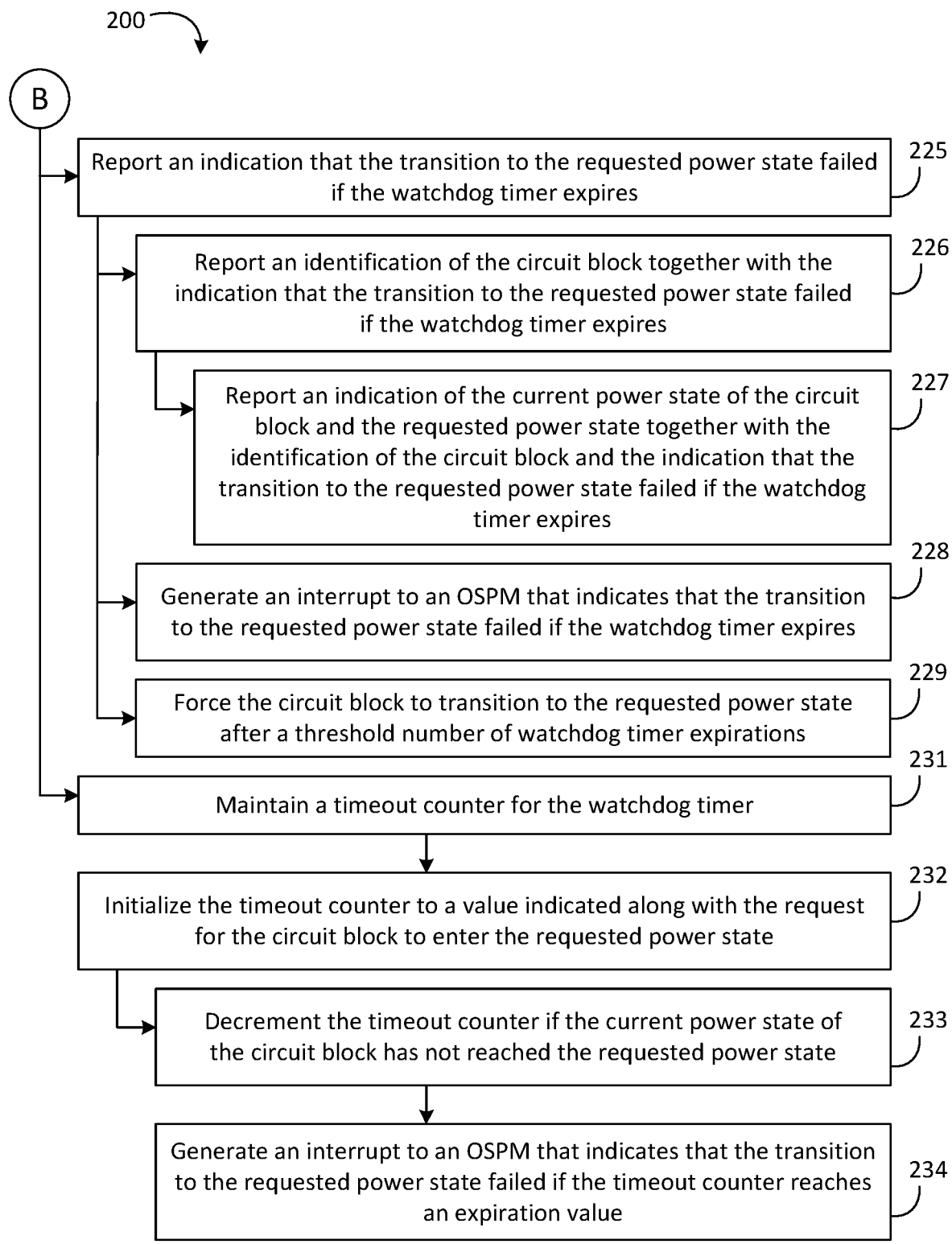

With reference to FIGS. 2A to 2B, an embodiment of a method 200 may include, at runtime, managing two or more power states for a circuit block at box 221, managing a request for the circuit block to enter a requested power state of the two or more power states at box 222, setting a watchdog timer in response to the request at box 223, and monitoring the watchdog timer and a transition of the circuit block from a current power state to the requested power state at box 224. Some embodiments of the method 200 may further include reporting an indication that the transition to the requested power state failed if the watchdog timer expires at box 225. For example, the method 200 may include reporting an identification of the circuit block together with the indication that the transition to the requested power state failed if the watchdog timer expires at box 226. The method 200 may also include reporting an indication of the current power state of the circuit block and the requested power state together with the identification of the circuit block and the indication that the transition to the requested power state failed if the watchdog timer expires at box 227. Some embodiments of the method 200 may also include generating an interrupt to an OSPM that indicates that the transition to the requested power state failed if the watchdog timer expires at box 228, and/or forcing the circuit block to transition to the requested power state after a threshold number of watchdog timer expirations at box 229 (e.g., or a threshold number of generated interrupts).

Some embodiments of the method 200 may additionally or alternatively include maintaining a timeout counter for the watchdog timer at box 231, and initializing the timeout counter to a value indicated along with the request for the circuit block to enter the requested power state at box 232. The method 200 may further include decrementing the timeout counter if the current power state of the circuit block has not reached the requested power state at box 233, and generating an interrupt to an OSPM that indicates that the transition to the requested power state failed if the timeout counter reaches an expiration value at box 234 (e.g., timeout counter=0).

Any of the circuit blocks described herein including, for example, the processor 804 (FIG. 8), the cores 808a, 808b, 808c (FIG. 8), the control hub 832 (FIG. 8), the VR 814 (FIG. 8), the memory interface 834 (FIG. 8), the core 990 (FIG. 9B), the cores 1102A-N (FIG. 11), the special purpose logic 1108 (FIG. 11), the IMCs 1114 (FIG. 11), the bus controller 1116 (FIG. 11), the processor 1210 (FIG. 12), the controller hub 1220 (FIG. 12; e.g., and/or the GMCH 1290 and the IOH 1250), the co-processor 1245 (FIG. 12), the processor 1315 (FIG. 13), the processor 1370 (FIG. 13), the processor/coprocessor 1380 (FIG. 13), the coprocessor 1338 (FIG. 13), the chipset 1390 (FIG. 14), the coprocessor 1520 (FIG. 15), and/or the processors 1614, 1616 (FIG. 16), may be configured to perform an embodiment of the method 200 at runtime. In particular, embodiments of the method 200 may be performed by a suitably configured PCU 810a,b (FIG. 8), and/or PMIC 812 (FIG. 8).

Figure 3:
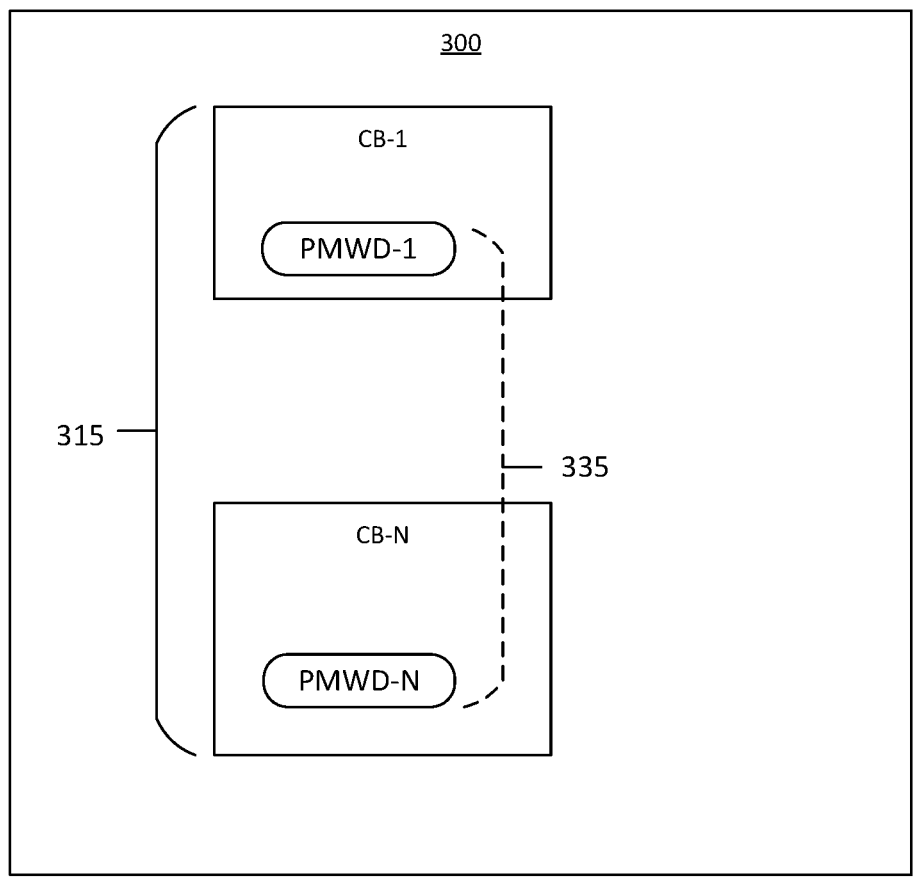
FIG. 3 is a block diagram of an example of an apparatus according to an embodiment.

With reference to FIG. 3, an embodiment of an apparatus 300 may include two or more circuit blocks (CBs) 315 (e.g., CB-1 through CB-N, where N>1) co-located on a same substrate, and two or more power management circuits 335 (e.g., PMWD circuits PMWD-1 through PMWD-N) respectively coupled to the two or more circuit blocks 315. As shown in FIG. 3, the PMWD circuits may be integrated with their respective circuit blocks. The two or more power management circuits 335 may be configured to manage two or more power states for a circuit block coupled thereto, to manage a request for the circuit block to enter a requested power state of the two or more power states, to set a watchdog timer in response to the request, and to monitor the watchdog timer and a transition of the circuit block from a current power state to the requested power state. In some embodiments, the two or more power management circuits 335 may be further configured to report an indication that the transition to the requested power state failed if the watchdog timer expires. For example, the two or more power management circuits 335 may be additionally configured to report an identification of the circuit block together with the indication that the transition to the requested power state failed if the watchdog timer expires. The two or more power management circuits 335 may also be configured to report an indication of the current power state of the circuit block and the requested power state together with the identification of the circuit block and the indication that the transition to the requested power state failed if the watchdog timer expires.

In some embodiments, the two or more power management circuits 335 may be further configured to generate an interrupt to an OSPM that indicates that the transition to the requested power state failed if the watchdog timer expires, and/or to force the circuit block to transition to the requested power state (e.g., after a threshold number of watchdog timer expirations or generated interrupts). For example, the circuit block may include internal hardware that is responsive to a failsafe signal from the PMWD to halt the current operation of the circuit block, save the state of the circuit block as needed, and transition to the requested power state. Embodiments of internal failsafe circuitry of the circuit block may force the transition and provide another level of failsafe power state transitions if the requested power state is not reached before the watchdog timer expires.

In some embodiments, the two or more power management circuits 335 may be additionally or alternatively configured to maintain a timeout counter for the watchdog timer, and to initialize the timeout counter to a value indicated along with the request for the circuit block to enter the requested power state. The two or more power management circuits 335 may also be configured to decrement the timeout counter if the current power state of the circuit block has not reached the requested power state, and to generate an interrupt to an OSPM that indicates that the transition to the requested power state failed if the timeout counter reaches an expiration value.

In some embodiments, the apparatus 300 may further include memory in each of the two or more power management circuits 335 to store the configuration information and/or data for the PMWD operation. The memory may be implemented with any suitable storage technology such as a buffer, a set of registers, counters, model specific registers (MSRs), RAM, etc. The configuration information may have any suitable data structure, such as a table of entries for each circuit block. Each entry in the table may include one or more fields that store different values for the circuit block (e.g., either the circuit block itself or an identifier associated with the circuit block) and a value for various factors associated with the circuit block.

Embodiments of the PMWD circuits 335 may be integrated with any of the circuit blocks described herein including, for example, the processor 804 (FIG. 8), the cores 808a, 808b, 808c (FIG. 8), the control hub 832 (FIG. 8), the VR 814 (FIG. 8), the memory interface 834 (FIG. 8), the core 990 (FIG. 9B), the cores 1102A-N (FIG. 11), the special purpose logic 1108 (FIG. 11), the IMCs 1114 (FIG. 11), the bus controller 1116 (FIG. 11), the processor 1210 (FIG. 12), the controller hub 1220 (FIG. 12; e.g., and/or the GMCH 1290 and the IOH 1250), the co-processor 1245 (FIG. 12), the processor 1315 (FIG. 13), the processor 1370 (FIG. 13), the processor/coprocessor 1380 (FIG. 13), the coprocessor 1338 (FIG. 13), the chipset 1390 (FIG. 14), the coprocessor 1520 (FIG. 15), and/or the processors 1614, 1616 (FIG. 16). In particular, embodiments of the PMWD circuits 335 may be incorporated in the PCU 810a,b (FIG. 8), and/or the PMIC 812 (FIG. 8).

Figure 4:
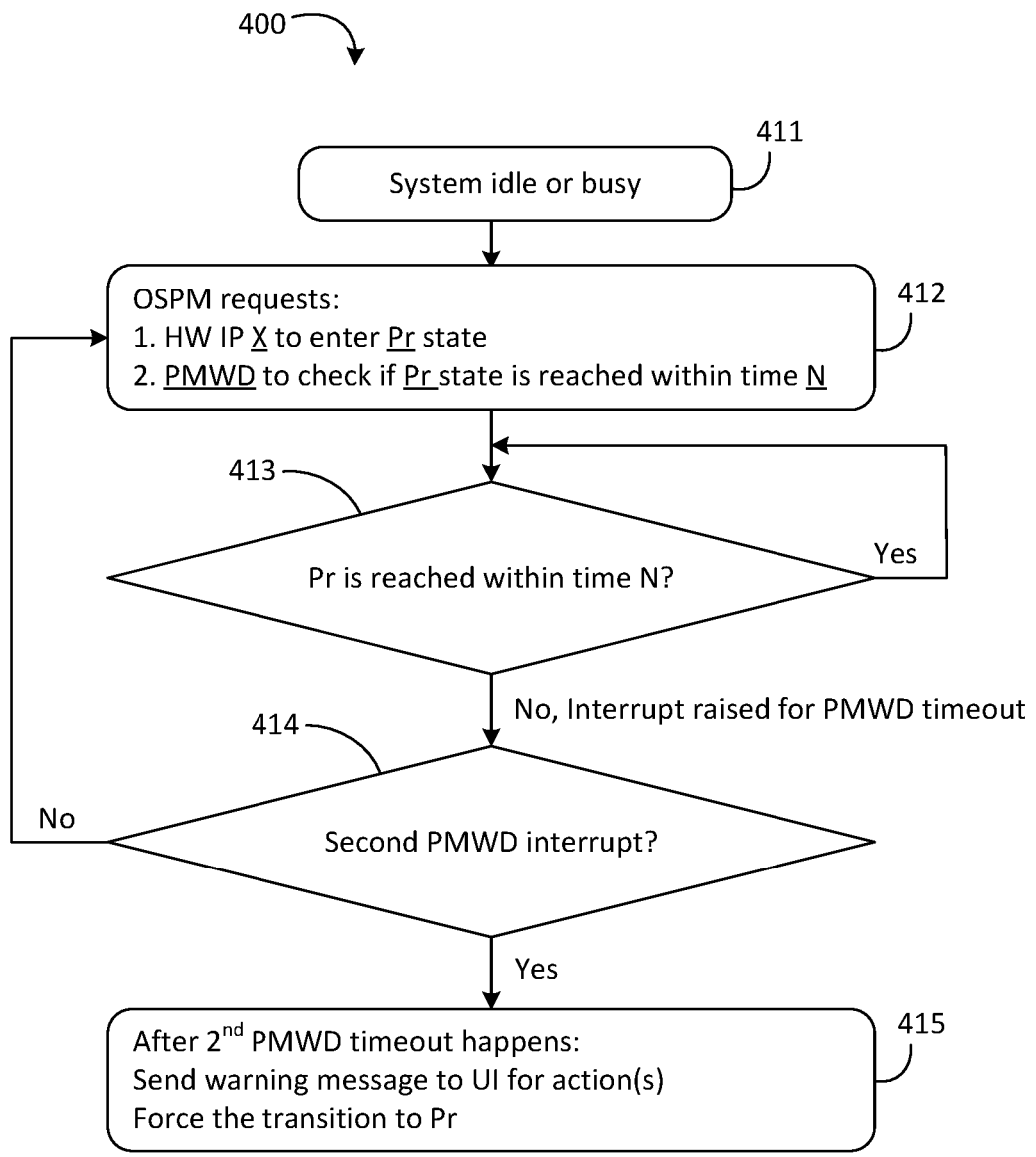
FIG. 4 is a flow diagram of an example of a workflow according to an embodiment.

With reference to FIG. 4, an embodiment of a workflow 400 illustrates an interaction between an operating system power management agent (e.g., an OSPM) and a PMWD module/agent, and an example scenario where a watchdog timeout interrupt happens. In this example, two consecutive timeout interrupts are considered to indicate that the HW IP failed to enter the requested low power state, and the OSPM is then to send a notification to the user for appropriate action(s). Example variables/registers maintained by the OSPM and PMWD include "X" to indicate the HW IP name (e.g., which may correspond to a serial port, a display controller, etc.), "Pr" to indicate a power state requested by the OSPM and for the PMWD to monitor on HW IP X, and "N" to indicate a time period that HW IP X should enter the power state Pr requested by the OSPM. For the workflow 400, the PMWD technology may be located within the HW IP X.

As shown in FIG. 4, the workflow 400 starts at box 411 where, after power-on, the system stays in an idle state or a busy state. At box 412, the OSPM requests the HW IP X to enter the Pr state, and asks the PMWD to monitor whether the Pr state is reached or not on the HW IP X within the time N. At box 413, the PMWD monitors whether the Pr state is reached within the time N, continually. If the HW IP X does not enter the Pr state within the time N at box 413, then an interrupt is raised to the OSPM for the PMWD timeout and the OSPM checks if the interrupt corresponds to a second PMWD timeout interrupt at box 414. If not, the OSPM returns to box 412 and again requests the HW IP X to enter the Pr state, and again asks the PMWD to monitor whether the Pr state is reached or not on the HW IP X within the time N. If the interrupt at box 414 corresponds to the second PMWD timeout interrupt, then the OSPM sends a warning message to a user interface (UI) at box 415 to indicate that the HW IP X failed to enter the requested Pr state (e.g., and that hardware devices may be wasting energy) and to take further appropriate automatic or manual action. If the circuit block is suitably configured, the workflow 400 may also include forcing the transition to Pr after the second PMWD timeout interrupt at box 415.

Example of PWMD Technology Inside a Circuit Block

Embodiments of a PMWD may be provided in a circuit block and preferably in each circuit block of a system to monitor whether a power state requested by the OSPM is reached or not within a timeout period. For example, embodiments may check whether a current power state of the circuit block is deeper than a power state requested by the OSPM. If the power state of the circuit block does not reach the requested power state in time, the PMWD will raise an interrupt to the OSPM.

Example registers and/or counters for an embodiment of a PMWD module/unit integrated with a circuit block include: a current power state register "CPS" that contains a current power state of the circuit block (e.g., P0 through Pn, where Pn corresponds to the deepest power state); a register "Px" to save the current power state of the circuit block; a register "Pr" to save the power state requested by the OSPM for the circuit block to enter; a register "N" to save a timeout period requested by the OSPM, where the OSPM expects the circuit block to enter the power state Pr within the period N; and a counter "time_out" to indicate when the watchdog timer times out (e.g., initialized to N as requested by the OSPM thereafter managed as a watchdog countdown timer).

Figure 5:
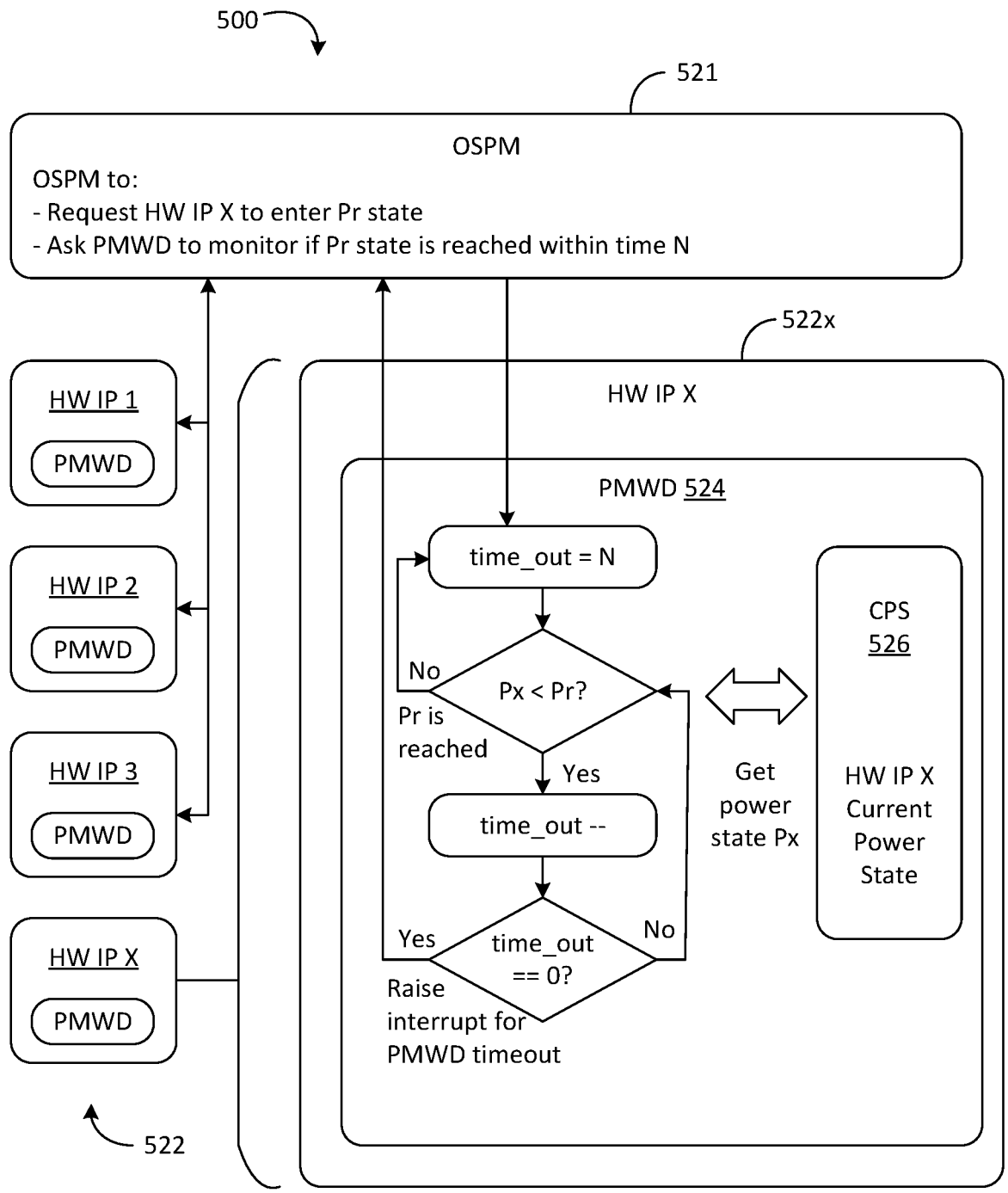
FIG. 5 is a block diagram of an example of a computer system according to an embodiment.

With reference to FIG. 5, an embodiment of a computer system 500 includes an OSPM 521 and a plurality of circuit blocks 522 (e.g., HW IP 1 through HW IP N) including a circuit block 522x (HW IP X) coupled to the OSPM. Each of the circuit blocks 522 includes a PWMD circuit integrated therewith, with an expanded view of a PMWD 524 for the circuit block 522x showing an embodiment of a PMWD flow (e.g., with the above-noted registers and counters). As shown in FIG. 5, the OSPM 521 requests the circuit block 522x to enter the Pr state (e.g., saving the requested power state in the register Pr) and sends a time period N to the PMWD 524 for the watchdog timeout. The PMWD 524 initializes the time_out counter to be equal to N per the OSPM request. The PMWD 524 then checks whether a current power state Px is deeper than the request power state Pr. For example, the PMWD gets the current power state from a CPS register 526 and sets the register Px to the value of the CPS 526. The PMWD 524 then checks if the Pr power state is reached by comparing the value of the registers Pr and Px. If Px is greater than or equal to Pr, then the Pr state is reached and the PMWD 524 returns to re-set the time_out counter to N and the power state failsafe monitoring continues.

If Px<Pr, then the PMWD 524 proceeds to decrease the time_out counter. Because the current power state stored in Px is not deeper than Pr (e.g., the Pr state is not reached), the time_out counter counts down towards the watchdog timeout. The PMWD 524 then checks if the time_out counter is equal to zero. If not, then the PWMD 524 returns to re-check the current power state and the power state failsafe monitoring continues. If the time_out counter reaches zero, then the PMWD 524 raises an interrupt to the OSPM 521 to indicate the power state transition failure of the circuit block 522x.

Embodiments of the PMWD circuit 524 may be integrated with any of the circuit blocks described herein including, for example, the processor 804 (FIG. 8), the cores 808a, 808b, 808c (FIG. 8), the control hub 832 (FIG. 8), the VR 814 (FIG. 8), the memory interface 834 (FIG. 8), the core 990 (FIG. 9B), the cores 1102A-N (FIG. 11), the special purpose logic 1108 (FIG. 11), the IMCs 1114 (FIG. 11), the bus controller 1116 (FIG. 11), the processor 1210 (FIG. 12), the controller hub 1220 (FIG. 12; e.g., and/or the GMCH 1290 and the IOH 1250), the co-processor 1245 (FIG. 12), the processor 1315 (FIG. 13), the processor 1370 (FIG. 13), the processor/coprocessor 1380 (FIG. 13), the coprocessor 1338 (FIG. 13), the chipset 1390 (FIG. 14), the coprocessor 1520 (FIG. 15), and/or the processors 1614, 1616 (FIG. 16). In particular, embodiments of the PMWD circuit 524 may be incorporated in the PCU 810a,b (FIG. 8), and/or the PMIC 812 (FIG. 8).

Figure 6:
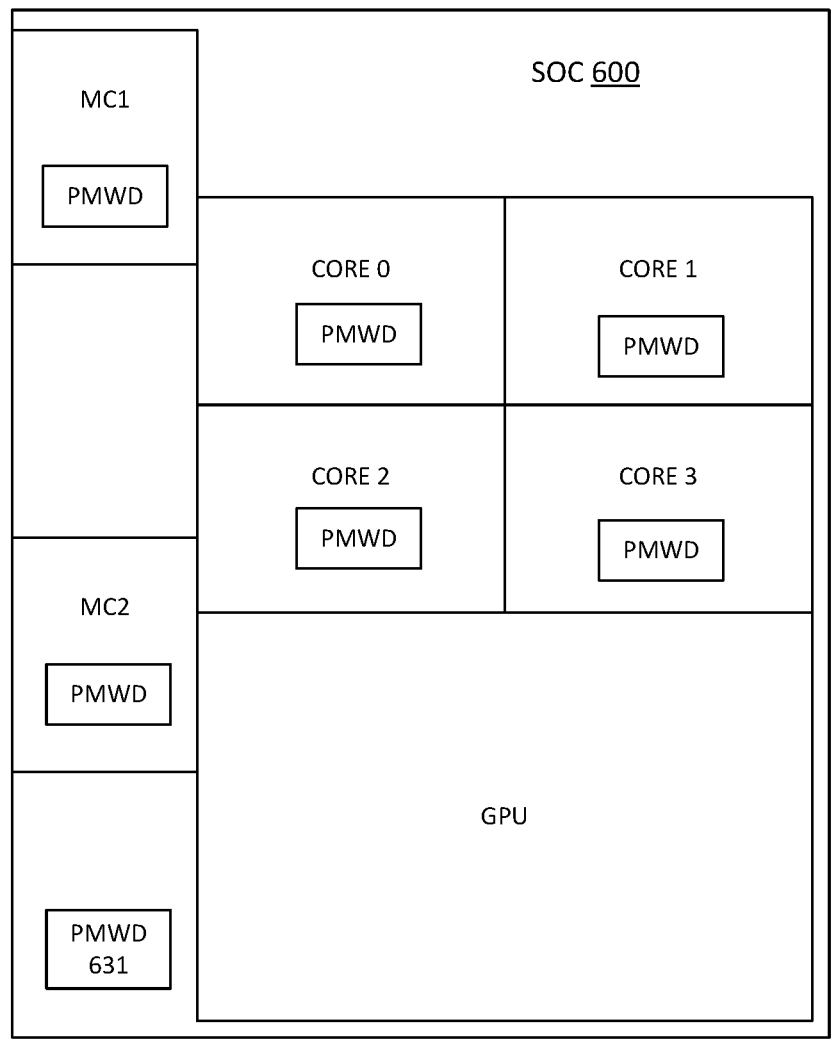
FIG. 6 is a block diagram of an example of a die of a system-on-a-chip (SOC) according to an embodiment.

FIG. 6 shows an embodiment of an SOC 600 that comprises a die with multiple IP blocks therein including the illustrated four cores (Core 0, Core 1, Core 2, and Core 3), a graphics processor unit (GPU), and two memory controllers (MC 1, MC 2). The die of the SOC 600 may be mounted between a package substrate and an integrated heat spreader (IHS). Thermal interface material (TIM) may be provided around the die of the SOC 600 and between the package substrate and the IHS. A plurality of the circuit blocks of the SOC 600 each comprise a PMWD circuit that implements one or more aspects of the embodiments described herein. An SOC with multiple IP blocks (e.g., such as SOC 600) may have different power states across each IP block. Advantageously, some embodiments provide circuit block-level granularity for failsafe power state management such that if a particular IP block of the SOC 600 becomes problematic, the PMWD circuit associated with the problematic IP block will monitor for a failed power state transition and identify the problematic IP block to the OSPM.

Although most of the PMWD circuits are illustrated in FIG. 6 as being co-located with their respective IP blocks, in some embodiments one or more of the PMWD circuits may be physically separated from their respective IP blocks and located elsewhere at a suitable location in the SOC 600 (e.g., in a controller such as a PCU). For example, a separate PMWD circuit 631 may be coupled to the GPU block. Alternatively, in some embodiments one or more of the PMWD circuits may be incorporated in another controller that is coupled to the SOC (e.g., an external PMIC, a PCU, etc.).

Figure 7:
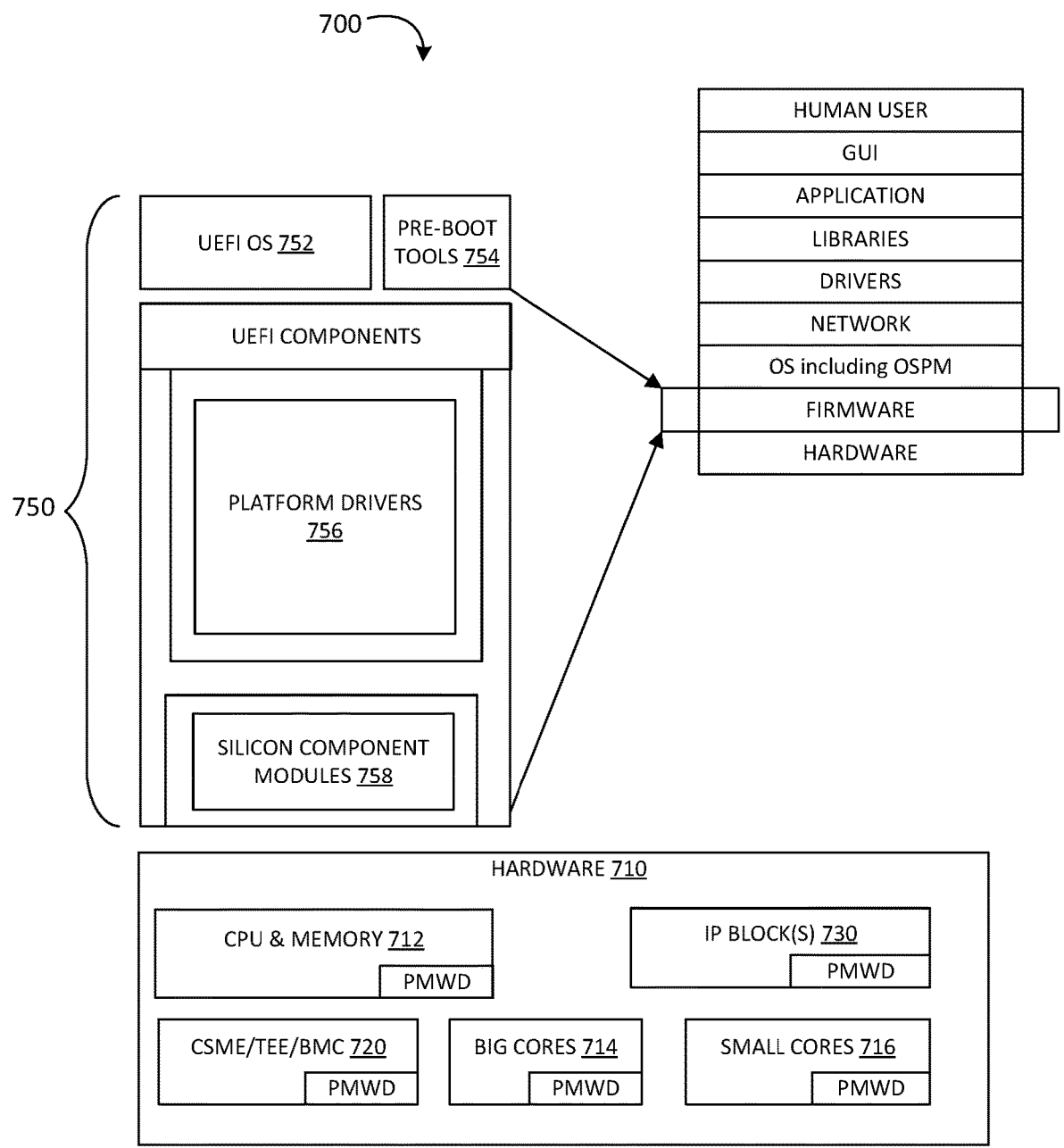
FIG. 7 is a block diagram of an example of a system according to an embodiment.

With reference to FIG. 7, an embodiment of a system 700 includes hardware 710 and software 750. The hardware 710 includes CPU and memory components 712, multiple cores including big cores 714 and small cores 716, various security and controller components 720 (e.g., such as INTEL Converged Security and Management Engine (CSME), a trusted execution environment (TEE), a baseboard management controller (BMC), etc.), and other IP block(s) 730, some of which incorporate a PMWD circuit that includes one or more aspects of the embodiments described herein. The software 750 includes various unified extensible firmware interface (UEFI) components including a UEFI OS 752, pre-boot tools 754, and UEFI platform initialization components (e.g., platform drivers 756, silicon component modules 758). A full system stack between the hardware 710 and a user may include firmware, an OS, a network interface, drivers, libraries, applications, and a graphical user interface. In accordance with some embodiments, the hardware 710 provides platform telemetry (e.g., power state information to be used by PMWD circuits), the OS and the firmware provide power management watchdog exposure and resource reservation, and the OS includes an OSPM that includes a power management watchdog mode.

FIG. 8 illustrates a computer system or computing device 800 (also referred to as device 800), where PMWD technology in two or more circuit blocks of the device 800, in accordance with some embodiments, generates interrupts to an OSPM of the device 800 based on failsafe power state management for the two or more circuit blocks of the device 800.

In some embodiments, device 800 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 800.

In an example, the device 800 comprises a SOC 801. An example boundary of the SOC 801 is illustrated using dotted lines in FIG. 8, with some example components being illustrated to be included within SOC 801. However, SOC 801 may include any appropriate components of device 800.

In some embodiments, device 800 includes processor 804. Processor 804 can include one or more physical devices, such as microprocessors, application processors, microcontrollers, programmable logic devices, processing cores, or other processing means. The processing operations performed by processor 804 include the execution of an operating platform or OS on which applications and/or device functions are executed. The processing operations include operations related to I/O (input/output) with a human user or with other devices, operations related to power management, operations related to connecting computing device 800 to another device, and/or the like. The processing operations may also include operations related to audio I/O and/or display I/O.

In some embodiments, processor 804 includes multiple processing cores 808a, 808b, 808c (also referred to individually or collectively as core(s) 808). Although merely three cores 808*a*, 808*b*, 808*c* are illustrated in FIG. 8, the processor 804 may include any other appropriate number of processing cores, e.g., tens, or even hundreds of processing cores. Processor cores 808*a*, 808*b*, 808*c* may be implemented on a single integrated circuit (IC) chip. Moreover, the chip may include one or more shared and/or private caches, buses or interconnections, graphics and/or memory controllers, or other components.

In some embodiments, processor 804 includes cache 806. In an example, sections of cache 806 may be dedicated to individual cores 808 (e.g., a first section of cache 806 dedicated to core 808*a*, a second section of cache 806 dedicated to core 808*b*, and so on). In an example, one or more sections of cache 806 may be shared among two or more of cores 808. Cache 806 may be split in different levels, e.g., level 1 (L1) cache, level 2 (L2) cache, level 3 (L3) cache, etc.

In some embodiments, a core 808 of the processor 804 may include a fetch unit to fetch instructions (including instructions with conditional branches) for execution by the core 808. The instructions may be fetched from any storage devices such as the memory 830. Core 808 may also include a decode unit to decode the fetched instruction. For example, the decode unit may decode the fetched instruction into a plurality of micro-operations. Core 808 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, core 808 may be an out-of-order processor core in one embodiment. Core 808 may also include a retirement unit. The retirement unit may retire executed instructions after they are committed. In an embodiment, retirement of the executed instructions may result in processor state being committed from the execution of the instructions, physical registers used by the instructions being de-allocated, etc. The processor 804 may also include a bus unit to enable communication between components of the processor 804 and other components via one or more buses. Processor 804 may also include one or more registers to store data accessed by various components of the cores 808 (such as values related to assigned app priorities and/or sub-system states (modes) association.

In some embodiments, device 800 comprises connectivity circuitries 831. For example, connectivity circuitries 831 includes hardware devices (e.g., wireless and/or wired connectors and communication hardware) and/or software components (e.g., drivers, protocol stacks), e.g., to enable device 800 to communicate with external devices. Device 800 may be separate from the external devices, such as other computing devices, wireless access points or base stations, etc.

In an example, connectivity circuitries 831 may include multiple different types of connectivity. To generalize, the connectivity circuitries 831 may include cellular connectivity circuitries, wireless connectivity circuitries, etc. Cellular connectivity circuitries of connectivity circuitries 831 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 831 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 831 may include a network interface, such as a wired or wireless interface, e.g., so that a system embodiment may be incorporated into a wireless device, for example, cell phone or personal digital assistant.

In some embodiments, device 800 comprises control hub 832, which represents hardware devices and/or software components related to interaction with one or more I/O devices. For example, processor 804 may communicate with one or more of display 822, one or more peripheral devices 824, storage devices 828, one or more other external devices 829, etc., via control hub 832. Control hub 832 may be a chipset, a Platform Control Hub (PCH), and/or the like.

For example, control hub 832 illustrates one or more connection points for additional devices that connect to device 800, e.g., through which a user might interact with the system. For example, devices (e.g., devices 829) that can be attached to device 800 include microphone devices, speaker or stereo systems, audio devices, video systems or other display devices, keyboard or keypad devices, or other I/O devices for use with specific applications such as card readers or other devices.

As mentioned above, control hub 832 can interact with audio devices, display 822, etc. For example, input through a microphone or other audio device can provide input or commands for one or more applications or functions of device 800. Additionally, audio output can be provided instead of, or in addition to display output. In another example, if display 822 includes a touch screen, display 822 also acts as an input device, which can be at least partially managed by control hub 832. There can also be additional buttons or switches on computing device 800 to provide I/O functions managed by control hub 832. In one embodiment, control hub 832 manages devices such as accelerometers, cameras, light sensors or other environmental sensors, or other hardware that can be included in device 800. The input can be part of direct user interaction, as well as providing environmental input to the system to influence its operations (such as filtering for noise, adjusting displays for brightness detection, applying a flash for a camera, or other features).

In some embodiments, control hub 832 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 822 represents hardware (e.g., display devices) and software (e.g., drivers) components that provide a visual and/or tactile display for a user to interact with device 800. Display 822 may include a display interface, a display screen, and/or hardware device used to provide a display to a user. In some embodiments, display 822 includes a touch screen (or touch pad) device that provides both output and input to a user. In an example, display 822 may communicate directly with the processor 804. Display 822 can be one or more of an internal display device, as in a mobile electronic device or a laptop device or an external display device attached via a display interface (e.g., DisplayPort, etc.). In one embodiment display 822 can be a head mounted display (HMD) such as a stereoscopic display device for use in virtual reality (VR) applications or augmented reality (AR) applications.

In some embodiments and although not illustrated in the figure, in addition to (or instead of) processor 804, device 800 may include Graphics Processing Unit (GPU) comprising one or more graphics processing cores, which may control one or more aspects of displaying contents on display 822.

Control hub 832 (or platform controller hub) may include hardware interfaces and connectors, as well as software components (e.g., drivers, protocol stacks) to make peripheral connections, e.g., to peripheral devices 824.

It will be understood that device 800 could both be a peripheral device to other computing devices, as well as have peripheral devices connected to it. Device 800 may have a "docking" connector to connect to other computing devices for purposes such as managing (e.g., downloading and/or uploading, changing, synchronizing) content on device 800. Additionally, a docking connector can allow device 800 to connect to certain peripherals that allow computing device 800 to control content output, for example, to audiovisual or other systems.

In addition to a proprietary docking connector or other proprietary connection hardware, device 800 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 831 may be coupled to control hub 832, e.g., in addition to, or instead of, being coupled directly to the processor 804. In some embodiments, display 822 may be coupled to control hub 832, e.g., in addition to, or instead of, being coupled directly to processor 804.

In some embodiments, device 800 comprises memory 830 coupled to processor 804 via memory interface 834. Memory 830 includes memory devices for storing information in device 800. Memory can include nonvolatile (state does not change if power to the memory device is interrupted) and/or volatile (state is indeterminate if power to the memory device is interrupted) memory devices. Memory 830 can be a dynamic random access memory (DRAM) device, a static random access memory (SRAM) device, flash memory device, phase-change memory device, or some other memory device having suitable performance to serve as process memory. In one embodiment, memory 830 can operate as system memory for device 800, to store data and instructions for use when the one or more processors 804 executes an application or process. Memory 830 can store application data, user data, music, photos, documents, or other data, as well as system data (whether long-term or temporary) related to the execution of the applications and functions of device 800.

Elements of various embodiments and examples are also provided as a machine-readable medium (e.g., memory 830) for storing the computer-executable instructions (e.g., instructions to implement any other processes discussed herein). The machine-readable medium (e.g., memory 830) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 800 comprises temperature measurement circuitries 840, e.g., for measuring temperature of various components of device 800. In an example, temperature measurement circuitries 840 may be embedded, or coupled or attached to various components, whose temperature are to be measured and monitored. For example, temperature measurement circuitries 840 may measure temperature of (or within) one or more of cores 808a, 808b, 808c, voltage regulator 814, memory 830, a mother-board of SOC 801, and/or any appropriate component of device 800.

In some embodiments, device 800 comprises power measurement circuitries 842, e.g., for measuring power consumed by one or more components of the device 800. In an example, in addition to, or instead of, measuring power, the power measurement circuitries 842 may measure voltage and/or current. In an example, the power measurement circuitries 842 may be embedded, or coupled or attached to various components, whose power, voltage, and/or current consumption are to be measured and monitored. For example, power measurement circuitries 842 may measure power, current and/or voltage supplied by one or more voltage regulators 814, power supplied to SOC 801, power supplied to device 800, power consumed by processor 804 (or any other component) of device 800, etc.

In some embodiments, device 800 comprises one or more voltage regulator circuitries, generally referred to as voltage regulator (VR) 814. VR 814 generates signals at appropriate voltage levels, which may be supplied to operate any appropriate components of the device 800. Merely as an example, VR 814 is illustrated to be supplying signals to processor 804 of device 800. In some embodiments, VR 814 receives one or more Voltage Identification (VID) signals, and generates the voltage signal at an appropriate level, based on the VID signals. Various type of VRs may be utilized for the VR 814. For example, VR 814 may include a "buck" VR, "boost" VR, a combination of buck and boost VRs, low dropout (LDO) regulators, switching DC-DC regulators, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR which is controlled by PCU 810a/b and/or PMIC 812. In some embodiments, each core has a network of distributed LDOs to provide efficient control for power management. The LDOs can be digital, analog, or a combination of digital or analog LDOs.

In some embodiments, device 800 comprises one or more clock generator circuitries, generally referred to as clock generator 816. Clock generator 816 generates clock signals at appropriate frequency levels, which may be supplied to any appropriate components of device 800. Merely as an example, clock generator 816 is illustrated to be supplying clock signals to processor 804 of device 800. In some embodiments, clock generator 816 receives one or more Frequency Identification (FID) signals, and generates the clock signals at an appropriate frequency, based on the FID signals.

In some embodiments, device 800 comprises battery 818 supplying power to various components of device 800. Merely as an example, battery 818 is illustrated to be supplying power to processor 804. Although not illustrated in the figures, device 800 may comprise a charging circuitry, e.g., to recharge the battery, based on Alternating Current (AC) power supply received from an AC adapter.

In some embodiments, device 800 comprises Power Control Unit (PCU) 810 (also referred to as Power Management Unit (PMU), Power Controller, etc.). In an example, some sections of PCU 810 may be implemented by one or more processing cores 808, and these sections of PCU 810 are symbolically illustrated using a dotted box and labelled PCU 810a. In an example, some other sections of PCU 810 may be implemented outside the processing cores 808, and these sections of PCU 810 are symbolically illustrated using a dotted box and labelled as PCU 810b. PCU 810 may implement various power management operations for device 800. PCU 810 may include hardware interfaces, hardware circuitries, connectors, registers, etc., as well as software components (e.g., drivers, protocol stacks), to implement various power management operations for device 800.

In some embodiments, device 800 comprises Power Management Integrated Circuit (PMIC) 812, e.g., to implement various power management operations for device 800. In some embodiments, PMIC 812 is a Reconfigurable Power Management ICs (RPMICs) and/or an IMVP (Intel® Mobile Voltage Positioning). In an example, the PMIC is within an IC chip separate from processor 804. The may implement various power management operations for device 800. PMIC 812 may include hardware interfaces, hardware circuitries, connectors, registers, etc., as well as software components (e.g., drivers, protocol stacks), to implement various power management operations for device 800.

In an example, device 800 comprises one or both PCU 810 or PMIC 812. In an example, any one of PCU 810 or PMIC 812 may be absent in device 800, and hence, these components are illustrated using dotted lines.

Various power management operations of device 800 may be performed by PCU 810, by PMIC 812, or by a combination of PCU 810 and PMIC 812. For example, PCU 810 and/or PMIC 812 may select a power state (e.g., P-state) for various components of device 800. For example, PCU 810 and/or PMIC 812 may select a power state (e.g., in accordance with the ACPI (Advanced Configuration and Power Interface) specification) for various components of device 800. Merely as an example, PCU 810 and/or PMIC 812 may cause various components of the device 800 to transition to a sleep state, to an active state, to an appropriate C state (e.g., C0 state, or another appropriate C state, in accordance with the ACPI specification), etc. In an example, PCU 810 and/or PMIC 812 may control a voltage output by VR 814 and/or a frequency of a clock signal output by the clock generator, e.g., by outputting the VID signal and/or the FID signal, respectively. In an example, PCU 810 and/or PMIC 812 may control battery power usage, charging of battery 818, and features related to power saving operation. In accordance with some embodiments, PMWD technology may utilize a watchdog timer for various components of the device 800 to monitor a transition between power states of the various components (e.g., particularly from higher power states to lower power states) and provide a failsafe that generates an interrupt to an OSPM if the transition fails (e.g., if the watchdog timer expires).

The clock generator 816 can comprise a phase locked loop (PLL), frequency locked loop (FLL), or any suitable clock source. In some embodiments, each core of processor 804 has its own clock source. As such, each core can operate at a frequency independent of the frequency of operation of the other core. In some embodiments, PCU 810 and/or PMIC 812 performs adaptive or dynamic frequency scaling or adjustment. For example, clock frequency of a processor core can be increased if the core is not operating at its maximum power consumption threshold or limit. In some embodiments, PCU 810 and/or PMIC 812 determines the operating condition of each core of a processor, and opportunistically adjusts frequency and/or power supply voltage of that core without the core clocking source (e.g., PLL of that core) losing lock when the PCU 810 and/or PMIC 812 determines that the core is operating below a target performance level. For example, if a core is drawing current from a power supply rail less than a total current allocated for that core or processor 804, then PCU 810 and/or PMIC 812 can temporarily increase the power draw for that core or processor 804 (e.g., by increasing clock frequency and/or power supply voltage level) so that the core or processor 804 can perform at higher performance level. As such, voltage and/or frequency can be increased temporarily for processor 804 without violating product reliability.

In an example, PCU 810 and/or PMIC 812 may perform power management operations, e.g., based at least in part on receiving measurements from power measurement circuitries 842, temperature measurement circuitries 840, charge level of battery 818, and/or any other appropriate information that may be used for power management. To that end, PMIC 812 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 810 and/or PMIC 812 in at least one embodiment to allow PCU 810 and/or PMIC 812 to manage processor core energy at least in part based on value(s) detected by one or more of the sensors.

Also illustrated is an example software stack of device 800 (although not all elements of the software stack are illustrated). Merely as an example, processors 804 may execute application programs 850, OS 852, one or more Power Management (PM) specific application programs (e.g., generically referred to as PM applications 858), and/or the like. PM applications 858 may also be executed by the PCU 810 and/or PMIC 812. OS 852 may also include one or more PM applications 856a, 856b, 856c (e.g., including an OSPM). The OS 852 may also include various drivers 854a, 854b, 854c, etc., some of which may be specific for power management purposes. In some embodiments, device 800 may further comprise a Basic Input/Output System (BIOS) 820. BIOS 820 may communicate with OS 852 (e.g., via one or more drivers 854), communicate with processors 804, etc.

For example, one or more of PM applications 858, 856, drivers 854, BIOS 820, etc. may be used to implement power management specific tasks, e.g., to control voltage and/or frequency of various components of device 800, to control wake-up state, sleep state, and/or any other appropriate power state of various components of device 800, control battery power usage, charging of the battery 818, features related to power saving operation, etc.

In some embodiments, multiple tasks are variously performed each with a respective one of application programs 850 and/or OS 852. At a given time during operation of computing device 800, at least some of the tasks each result in, or otherwise correspond to, a respective input being received via one or more human interface devices (HIDs). Said tasks each further include or otherwise correspond to a different respective data flow by which computing device 800 communicates with one or more networks (e.g., via connectivity circuitries 831). User input and/or other characteristics of user behavior are detected with the one or more HIDs, and provide a basis for detecting a relative interest by the user in one task over one or more other copending tasks. By way of illustration and not limitation, OS 852 provides a kernel space in which QoS logic, a filter driver, and/or other suitable software logic executes to detect a task which is currently of relatively greater user interest, and to prioritize a data flow which corresponds to said task. An indication of the relative prioritization of tasks (e.g., and the relative prioritization of corresponding data flows) is communicated, for example, from processor 804 to connectivity circuitries 831. Based on such signaling, connectivity circuitries 831 variously processes data packets according to the prioritization of tasks relative to each other.

In accordance with some embodiments, the PMIC 812 and/or a PCU (e.g., such as PCU 810a inside the core 808a, or such as the PCU 810b outside the processor 804) is further configured with PMWD technology as described herein to generate interrupts to an OSPM of the OS 852 based on monitoring of the blocks of the SOC 801 (e.g., the cores 808, the cache 806, the VR(s) 814, the memory interface 834, etc.). In some embodiments, power state data may be provided to the suitably configured PCU/PMIC, the PCU/PMIC monitors the watchdog timers and the transition from current power states to requested power states, and the PCU/PMIC generates interrupts to the OSPM as needed (e.g., together with information that identifies the block that failed to transition, and optionally also the current power state of the block and the requested power state).

Those skilled in the art will appreciate that a wide variety of devices may benefit from the foregoing embodiments. The following exemplary core architectures, processors, and computer architectures are non-limiting examples of devices that may beneficially incorporate embodiments of the technology described herein.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch unit 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the invention. FIG. 10B includes an L1 data cache 1006A part of the L1 cache 1006, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 11:
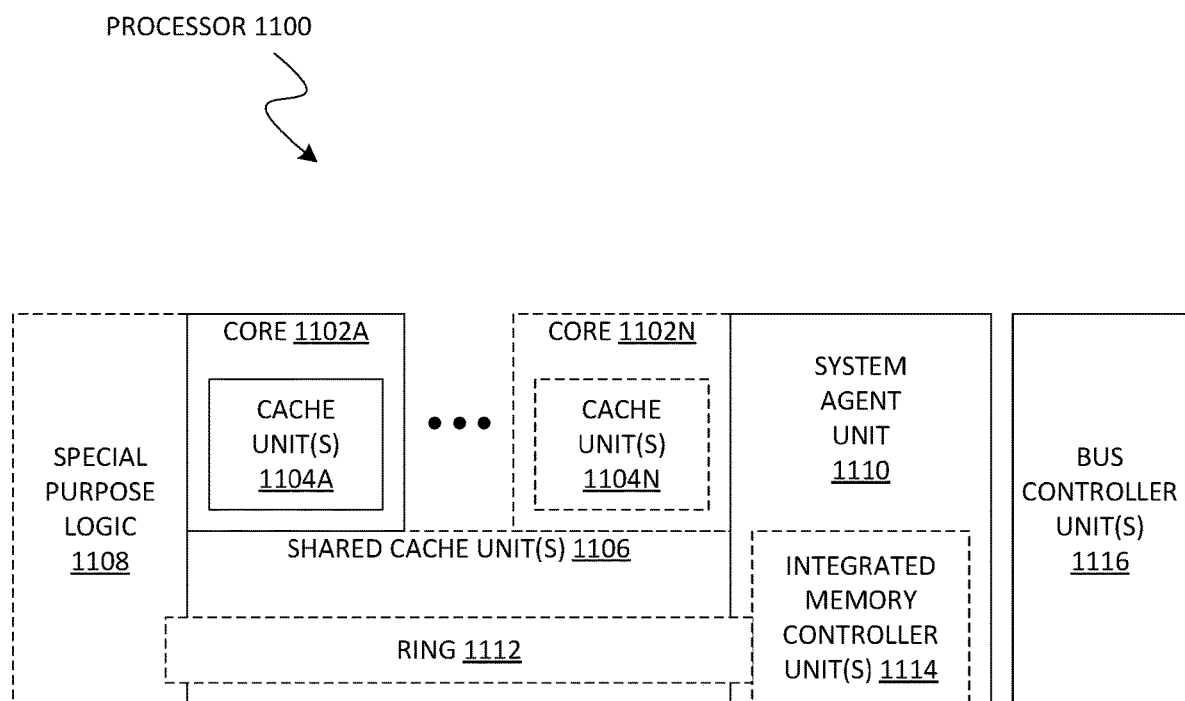
FIG. 11 is a block diagram of a processor that may have more than one core, may have an integrated memory controller, and may have integrated graphics according to embodiments of the invention.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of respective caches 1104A-N within the cores 1102A-N, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
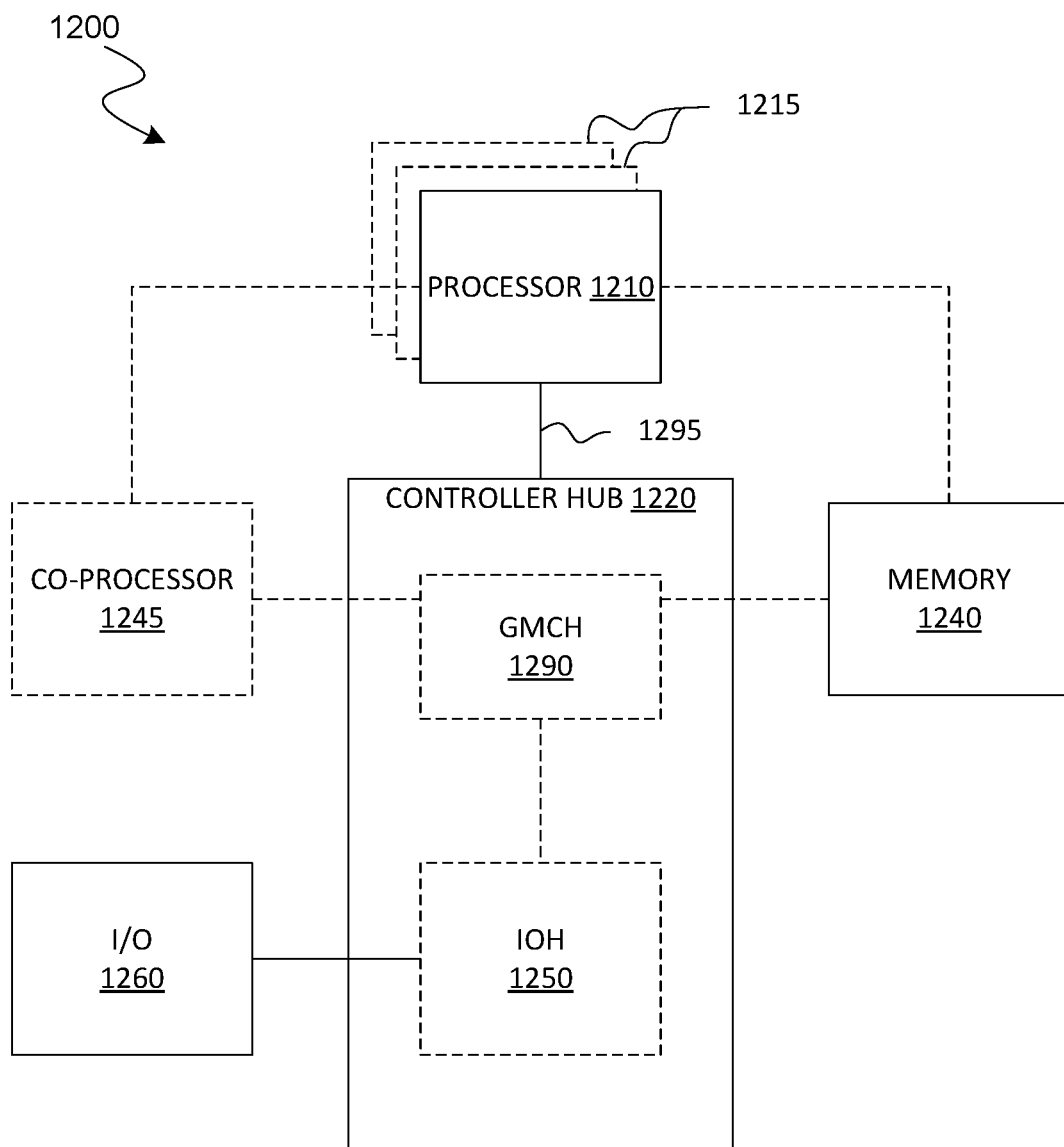
FIGS. 12-15 are block diagrams of exemplary computer architectures.

Referring now to FIG. 12, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources of the processors 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
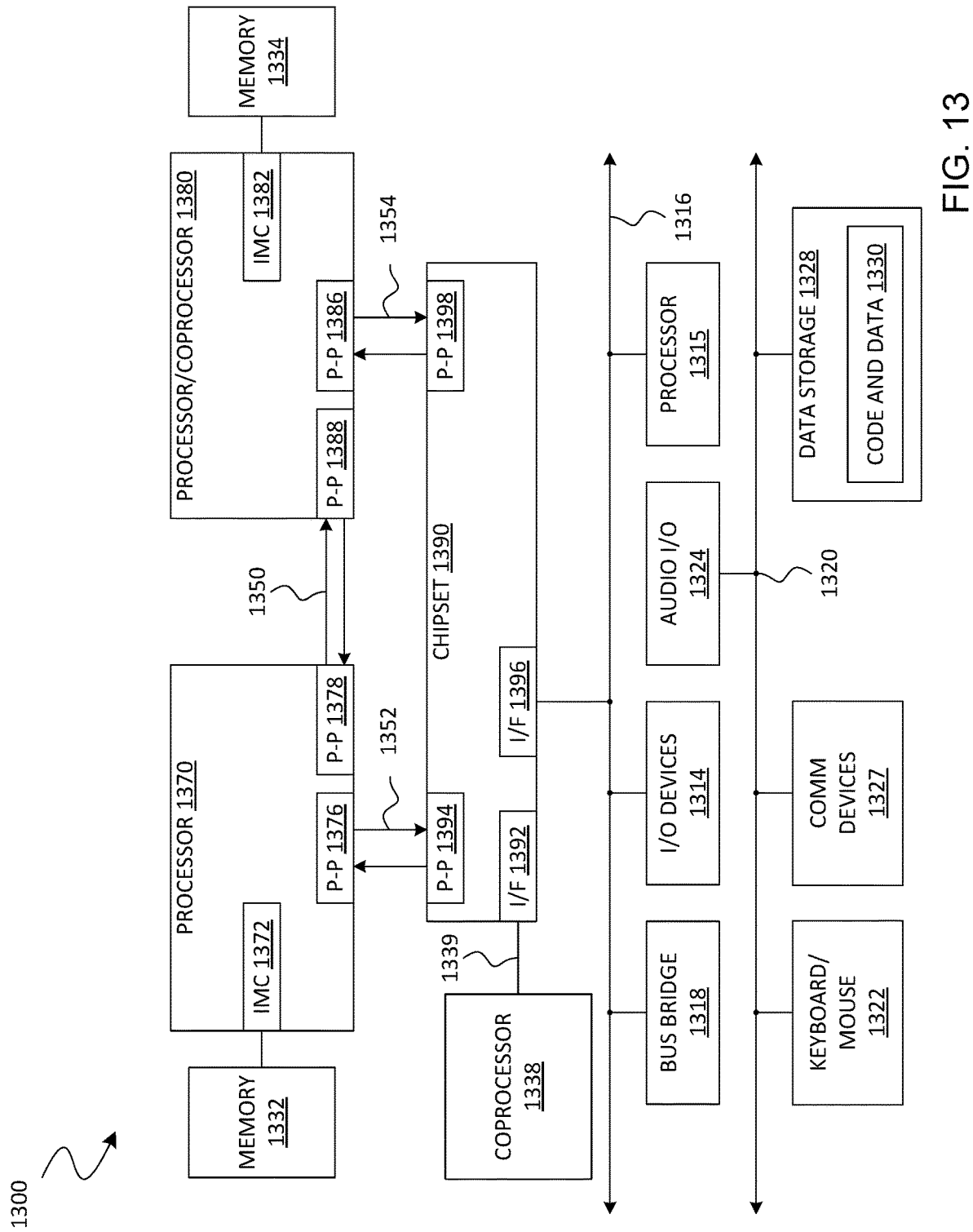

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339 and an interface 1392. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
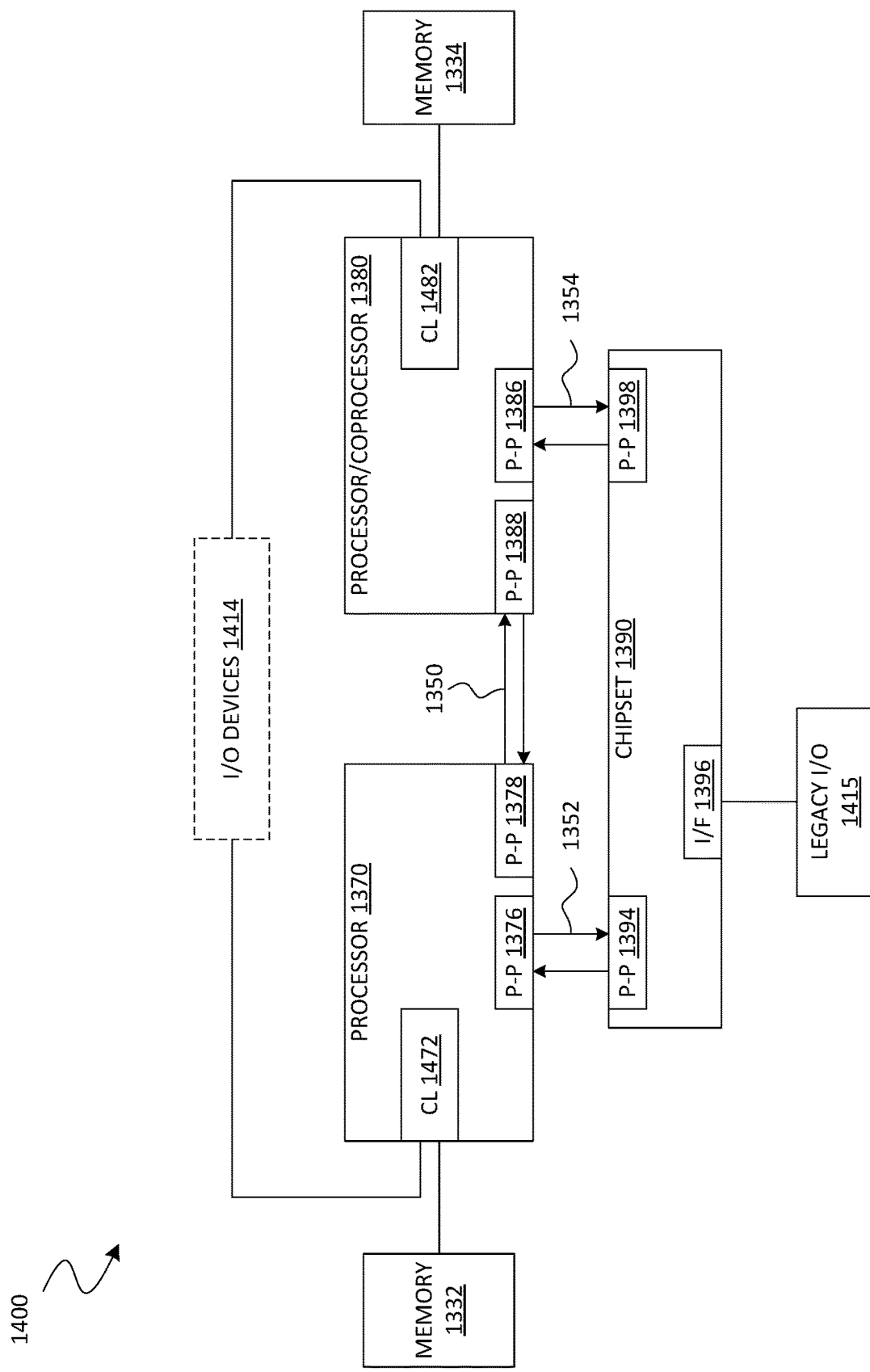

Referring now to FIG. 14, shown is a block diagram of a second more specific exemplary system 1400 in accordance with an embodiment of the present invention Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1472 and 1482, respectively. Thus, the CL 1472, 1482 include integrated memory controller units and include I/O control logic. FIG. 14 illustrates that not only are the memories 1332, 1334 coupled to the CL 1472, 1482, but also that I/O devices 1414 are also coupled to the control logic 1472, 1482. Legacy I/O devices 1415 are coupled to the chipset 1390.

Figure 15:
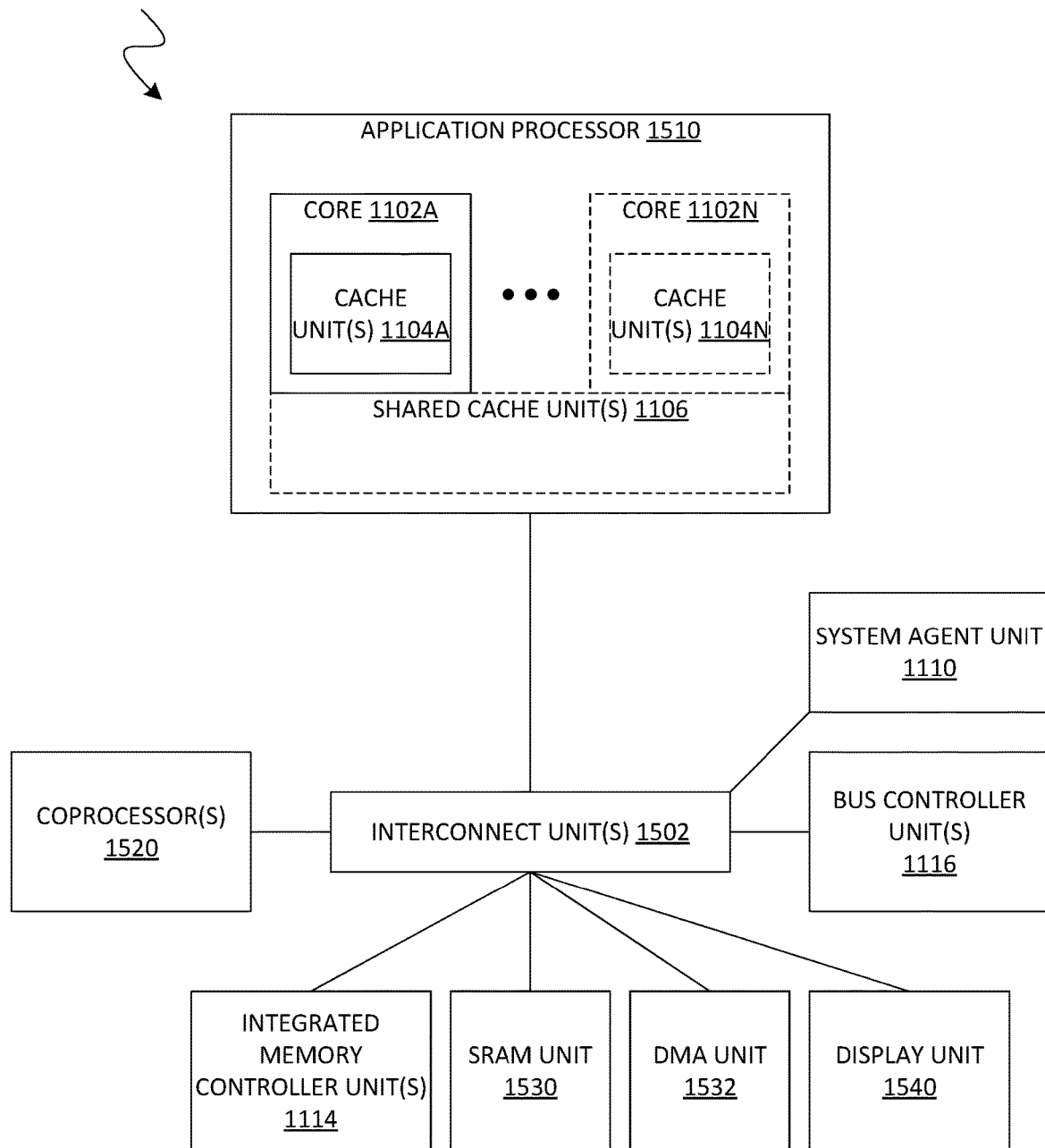
Figure 16:
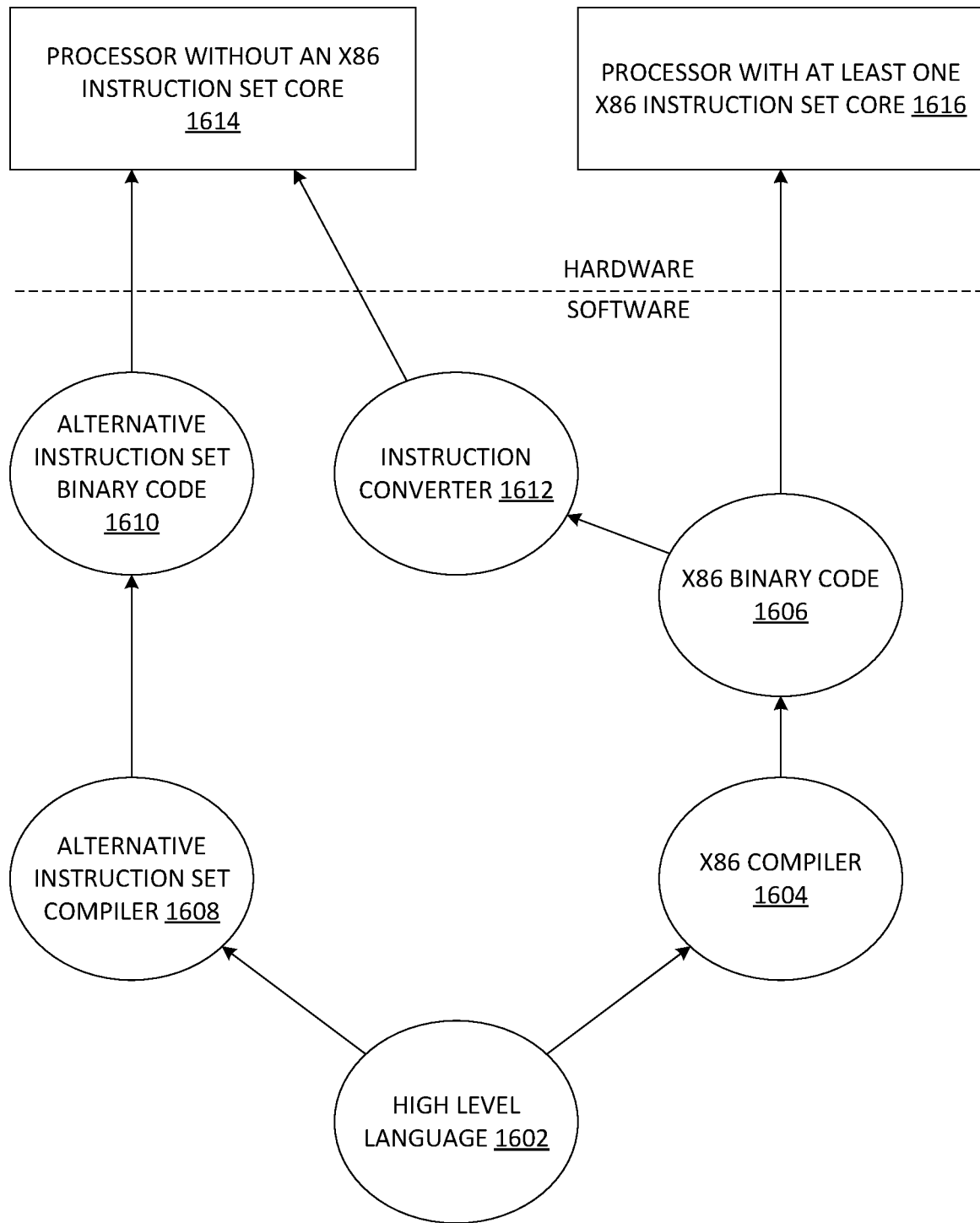
FIG. 16 is a block diagram contrasting the use of a software instruction converter to convert binary instructions in a source instruction set to binary instructions in a target instruction set according to embodiments of the invention.

Referring now to FIG. 15, shown is a block diagram of a SOC 1500 in accordance with an embodiment of the present invention. Similar elements in FIG. 15 bear like reference numerals. Also, dashed lined boxes are optional features on more advanced SOCs. In FIG. 15, an interconnect unit(s) 1502 is coupled to: an application processor 1510 which includes a set of one or more cores 1102A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, CA and/or that execute the ARM instruction set of ARM Holdings of Sunnyvale, CA). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

Techniques and architectures for power management watchdog technology are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

ADDITIONAL NOTES AND EXAMPLES

Example 1 includes an integrated circuit, comprising a circuit block, and a power management circuit coupled to the circuit block to manage two or more power states for the circuit block and to manage a request for the circuit block to enter a requested power state of the two or more power states, set a watchdog timer in response to the request, and monitor the watchdog timer and a transition of the circuit block from a current power state to the requested power state.

Example 2 includes the integrated circuit of Example 1, wherein the power management circuit is further to report an indication that the transition to the requested power state failed if the watchdog timer expires.

Example 3 includes the integrated circuit of Example 2, wherein the power management circuit is further to report an identification of the circuit block together with the indication that the transition to the requested power state failed if the watchdog timer expires.

Example 4 includes the integrated circuit of Example 3, wherein the power management circuit is further to report an indication of the current power state of the circuit block and the requested power state together with the identification of the circuit block and the indication that the transition to the requested power state failed if the watchdog timer expires.

Example 5 includes the integrated circuit of any of Examples 2 to 4, wherein the power management circuit is further to generate an interrupt to an operating system power manager that indicates that the transition to the requested power state failed if the watchdog timer expires.

Example 5A includes the integrated circuit of any of Examples 2 to 5, wherein the power management circuit is further to force the circuit block to transition to the requested power state after a threshold number of watchdog timer expirations.

Example 6 includes the integrated circuit of any of Examples 1 to 5A, wherein the power management circuit is further to maintain a timeout counter for the watchdog timer, and initialize the timeout counter to a value indicated along with the request for the circuit block to enter the requested power state.

Example 7 includes the integrated circuit of Example 6, wherein the power management circuit is further to decrement the timeout counter if the current power state of the circuit block has not reached the requested power state, and generate an interrupt to an operating system power manager that indicates that the transition to the requested power state failed if the timeout counter reaches an expiration value.

Example 8 includes a method, comprising managing two or more power states for a circuit block, managing a request for the circuit block to enter a requested power state of the two or more power states, setting a watchdog timer in response to the request, and monitoring the watchdog timer and a transition of the circuit block from a current power state to the requested power state.

Example 9 includes the method of Example 8, further comprising reporting an indication that the transition to the requested power state failed if the watchdog timer expires.

Example 10 includes the method of Example 9, further comprising reporting an identification of the circuit block together with the indication that the transition to the requested power state failed if the watchdog timer expires.

Example 11 includes the method of Example 10, further comprising reporting an indication of the current power state of the circuit block and the requested power state together with the identification of the circuit block and the indication that the transition to the requested power state failed if the watchdog timer expires.

Example 12 includes the method of any of Examples 9 to 11, further comprising generating an interrupt to an operating system power manager that indicates that the transition to the requested power state failed if the watchdog timer expires.

Example 12A includes the method of any of Examples 9 to 12, further comprising forcing the circuit block to transition to the requested power state after a threshold number of watchdog timer expirations.

Example 13 includes the method of any of Examples 8 to 12A, further comprising maintaining a timeout counter for the watchdog timer, and initializing the timeout counter to a value indicated along with the request for the circuit block to enter the requested power state.

Example 14 includes the method of Example 13, further comprising decrementing the timeout counter if the current power state of the circuit block has not reached the requested power state, and generating an interrupt to an operating system power manager that indicates that the transition to the requested power state failed if the timeout counter reaches an expiration value.

Example 15 includes an apparatus, comprising two or more circuit blocks co-located on a same substrate, and two or more power management circuits respectively coupled to the two or more circuit blocks, the two or more power management circuits to manage two or more power states for a circuit block coupled thereto and to manage a request for the circuit block to enter a requested power state of the two or more power states, set a watchdog timer in response to the request, and monitor the watchdog timer and a transition of the circuit block from a current power state to the requested power state.

Example 16 includes the apparatus of Example 15, wherein the two or more power management circuits are further to report an indication that the transition to the requested power state failed if the watchdog timer expires.

Example 17 includes the apparatus of Example 16, wherein the two or more power management circuits are further to report an identification of the circuit block together with the indication that the transition to the requested power state failed if the watchdog timer expires.

Example 18 includes the apparatus of Example 17, wherein the two or more power management circuits are further to report an indication of the current power state of the circuit block and the requested power state together with the identification of the circuit block and the indication that the transition to the requested power state failed if the watchdog timer expires.

Example 19 includes the apparatus of any of Examples 16 to 18, wherein the two or more power management circuits are further to generate an interrupt to an operating system power manager that indicates that the transition to the requested power state failed if the watchdog timer expires.

Example 19A includes the apparatus of any of Examples 16 to 19, wherein the two or more power management circuits are further to force the circuit block to transition to the requested power state after a threshold number of watchdog timer expirations.

Example 20 includes the apparatus of any of Examples 15 to 19A, wherein the two or more power management circuits are further to maintain a timeout counter for the watchdog timer, and initialize the timeout counter to a value indicated along with the request for the circuit block to enter the requested power state.

Example 21 includes the apparatus of Example 20, wherein the two or more power management circuits are further to decrement the timeout counter if the current power state of the circuit block has not reached the requested power state, and generate an interrupt to an operating system power manager that indicates that the transition to the requested power state failed if the timeout counter reaches an expiration value.

Example 22 includes an apparatus, comprising means for managing two or more power states for a circuit block, means for managing a request for the circuit block to enter a requested power state of the two or more power states, means for setting a watchdog timer in response to the request, and means for monitoring the watchdog timer and a transition of the circuit block from a current power state to the requested power state.

Example 23 includes the apparatus of Example 22, further comprising means for reporting an indication that the transition to the requested power state failed if the watchdog timer expires.

Example 24 includes the apparatus of Example 23, further comprising means for reporting an identification of the circuit block together with the indication that the transition to the requested power state failed if the watchdog timer expires.

Example 25 includes the apparatus of Example 24, further comprising means for reporting an indication of the current power state of the circuit block and the requested power state together with the identification of the circuit block and the indication that the transition to the requested power state failed if the watchdog timer expires.

Example 26 includes the apparatus of any of Examples 23 to 25, further comprising means for generating an interrupt to an operating system power manager that indicates that the transition to the requested power state failed if the watchdog timer expires.

Example 26A includes the apparatus of any of Examples 23 to 26, further comprising means for forcing the circuit block to transition to the requested power state after a threshold number of watchdog timer expirations.

Example 27 includes the apparatus of any of Examples 22 to 26A, further comprising means for maintaining a timeout counter for the watchdog timer, and means for initializing the timeout counter to a value indicated along with the request for the circuit block to enter the requested power state.

Example 28 includes the apparatus of Example 27, further comprising means for decrementing the timeout counter if the current power state of the circuit block has not reached the requested power state, and means for generating an interrupt to an operating system power manager that indicates that the transition to the requested power state failed if the timeout counter reaches an expiration value.

Example 29 includes at least one non-transitory machine readable medium comprising a plurality of instructions that, in response to being executed on a computing device, cause the computing device to manage two or more power states for a circuit block, manage a request for the circuit block to enter a requested power state of the two or more power states, set a watchdog timer in response to the request, and monitor the watchdog timer and a transition of the circuit block from a current power state to the requested power state.

Example 30 includes the at least one non-transitory machine readable medium of Example 29, comprising a plurality of further instructions that, in response to being executed on the computing device, cause the computing device to report an indication that the transition to the requested power state failed if the watchdog timer expires.

Example 31 includes the at least one non-transitory machine readable medium of Example 30, comprising a plurality of further instructions that, in response to being executed on the computing device, cause the computing device to report an identification of the circuit block together with the indication that the transition to the requested power state failed if the watchdog timer expires.

Example 32 includes the at least one non-transitory machine readable medium of Example 31, comprising a plurality of further instructions that, in response to being executed on the computing device, cause the computing device to report an indication of the current power state of the circuit block and the requested power state together with the identification of the circuit block and the indication that the transition to the requested power state failed if the watchdog timer expires.

Example 33 includes the at least one non-transitory machine readable medium of any of Examples 30 to 32, comprising a plurality of further instructions that, in response to being executed on the computing device, cause the computing device to generate an interrupt to an operating system power manager that indicates that the transition to the requested power state failed if the watchdog timer expires.

Example 33A includes the at least one non-transitory machine readable medium of any of Examples 30 to 32, comprising a plurality of further instructions that, in response to being executed on the computing device, cause the computing device to force the circuit block to transition to the requested power state after a threshold number of watchdog timer expirations.

Example 34 includes the at least one non-transitory machine readable medium of any of Examples 29 to 33A, comprising a plurality of further instructions that, in response to being executed on the computing device, cause the computing device to maintain a timeout counter for the watchdog timer, and initialize the timeout counter to a value indicated along with the request for the circuit block to enter the requested power state.

Example 35 includes the at least one non-transitory machine readable medium of Example 34, comprising a plurality of further instructions that, in response to being executed on the computing device, cause the computing device to decrement the timeout counter if the current power state of the circuit block has not reached the requested power state, and generate an interrupt to an operating system power manager that indicates that the transition to the requested power state failed if the timeout counter reaches an expiration value.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An integrated circuit, comprising:
a circuit block; and
a power management circuit coupled to the circuit block to:
   manage two or more power states for the circuit block and to manage a request for the circuit block to enter a requested power state of the two or more power states;
   set a watchdog timer in response to the request;
   monitor the watchdog timer and a transition of the circuit block from a current power state to the requested power state;
   maintain a timeout counter for the watchdog timer;
   decrement the timeout counter if the current power state of the circuit block has not reached the requested power state; and
   generate an interrupt to an operating system power manager that indicates that the transition to the requested power state failed if the timeout counter reaches an expiration value.

2. The integrated circuit of claim 1, wherein the power management circuit is further to:
   report an indication that the transition to the requested power state failed if the watchdog timer expires.

3. The integrated circuit of claim 2, wherein the power management circuit is further to:
   report an identification of the circuit block together with the indication that the transition to the requested power state failed if the watchdog timer expires.

4. The integrated circuit of claim 3, wherein the power management circuit is further to:
   report an indication of the current power state of the circuit block and the requested power state together with the identification of the circuit block and the indication that the transition to the requested power state failed if the watchdog timer expires.

5. The integrated circuit of claim 2, wherein the power management circuit is further to:
   generate the interrupt to the operating system power manager that indicates that the transition to the requested power state failed if the watchdog timer expires.

6. The integrated circuit of claim 2, wherein the power management circuit is further to:
   force the circuit block to transition to the requested power state after a threshold number of watchdog timer expirations.

7. The integrated circuit of claim 1, wherein the power management circuit is further to initialize the timeout counter to a value indicated along with the request for the circuit block to enter the requested power state.

8. A method, comprising:
   managing two or more power states for a circuit block;
   managing a request for the circuit block to enter a requested power state of the two or more power states;
   setting a watchdog timer in response to the request;
   monitoring the watchdog timer and a transition of the circuit block from a current power state to the requested power state;
   maintaining a timeout counter for the watchdog timer;
   decrementing the timeout counter if the current power state of the circuit block has not reached the requested power state; and
   generating an interrupt to an operating system power manager that indicates that the transition to the requested power state failed if the timeout counter reaches an expiration value.

9. The method of claim 8, further comprising:
reporting an indication that the transition to the requested power state failed if the watchdog timer expires.

10. The method of claim 9, further comprising:
reporting an identification of the circuit block together with the indication that the transition to the requested power state failed if the watchdog timer expires.

11. The method of claim 10, further comprising:
reporting an indication of the current power state of the circuit block and the requested power state together with the identification of the circuit block and the indication that the transition to the requested power state failed if the watchdog timer expires.

12. The method of claim 9, further comprising:
generating the interrupt to the operating system power manager that indicates that the transition to the requested power state failed if the watchdog timer expires.

13. The method of claim 9, further comprising:
forcing the circuit block to transition to the requested power state after a threshold number of watchdog timer expirations.

14. The method of claim 8, further comprising:
initializing the timeout counter to a value indicated along with the request for the circuit block to enter the requested power state.

15. An apparatus, comprising:
two or more circuit blocks co-located on a same substrate; and
two or more power management circuits respectively coupled to the two or more circuit blocks, the two or more power management circuits to:
  manage two or more power states for a circuit block coupled thereto and to manage a request for the circuit block to enter a requested power state of the two or more power states;
  set a watchdog timer in response to the request;
  monitor the watchdog timer and a transition of the circuit block from a current power state to the requested power state;
  maintain a timeout counter for the watchdog timer;
  decrement the timeout counter if the current power state of the circuit block has not reached the requested power state; and
  generate an interrupt to an operating system power manager that indicates that the transition to the requested power state failed if the timeout counter reaches an expiration value.

16. The apparatus of claim 15, wherein the two or more power management circuits are further to:
report an indication that the transition to the requested power state failed if the watchdog timer expires.

17. The apparatus of claim 16, wherein the two or more power management circuits are further to:
report an identification of the circuit block together with the indication that the transition to the requested power state failed if the watchdog timer expires.

18. The apparatus of claim 17, wherein the two or more power management circuits are further to:
report an indication of the current power state of the circuit block and the requested power state together with the identification of the circuit block and the indication that the transition to the requested power state failed if the watchdog timer expires.

19. The apparatus of claim 16, wherein the two or more power management circuits are further to:
generate the interrupt to the operating system power manager that indicates that the transition to the requested power state failed if the watchdog timer expires.

20. The apparatus of claim 16, wherein the two or more power management circuits are further to:
force the circuit block to transition to the requested power state after a threshold number of watchdog timer expirations.

21. The apparatus of claim 15, wherein the two or more power management circuits are further to:
initialize the timeout counter to a value indicated along with the request for the circuit block to enter the requested power state.

* * * * *